(12) United States Patent
Saori

(10) Patent No.: US 7,106,520 B2
(45) Date of Patent: Sep. 12, 2006

(54) WIDE-ANGLE ZOOM LENS SYSTEM

(75) Inventor: Masakazu Saori, Saitama (JP)

(73) Assignee: PENTAX Corporation, Tokyo (JP)

( * ) Notice: Subject to any disclaimer, the term of this patent is extended or adjusted under 35 U.S.C. 154(b) by 104 days.

(21) Appl. No.: 10/836,224

(22) Filed: May 3, 2004

(65) Prior Publication Data

US 2004/0223230 A1 Nov. 11, 2004

(30) Foreign Application Priority Data

May 6, 2003 (JP) ............................. 2003-128211

(51) Int. Cl.
*G02B 15/14* (2006.01)
(52) U.S. Cl. ...................... 359/681; 359/685; 359/680
(58) Field of Classification Search ................ 359/680, 359/681, 682, 685
See application file for complete search history.

(56) References Cited

U.S. PATENT DOCUMENTS

| | | | | |
|---|---|---|---|---|
| 5,264,965 A | 11/1993 | Hirakawa | .................... | 359/686 |
| 5,748,384 A | 5/1998 | Sensui | ......................... | 359/686 |
| 6,317,271 B1 | 11/2001 | Sensui | ......................... | 359/686 |
| 6,710,931 B1 | 3/2004 | Misaka | ......................... | 359/686 |
| 2003/0086181 A1 | 5/2003 | Murata | ......................... | 359/680 |

FOREIGN PATENT DOCUMENTS

| | | |
|---|---|---|
| JP | 5-19170 | 1/1993 |
| JP | 11-174328 | 7/1999 |
| JP | 2000-338397 | 12/2000 |
| JP | 2001-83421 | 3/2001 |
| JP | 2001-318314 | 11/2001 |

*Primary Examiner*—David N. Spector
(74) *Attorney, Agent, or Firm*—Greenblum & Bernstein, P.L.C.

(57) ABSTRACT

A wide-angle zoom lens system includes a negative first lens group, a positive second lens group, a negative third lens group, and a positive fourth lens group. Upon zooming from the short focal length extremity to the long focal length extremity, the distance between the negative first lens group and the positive second lens group decreases, the distance between the positive second lens group and the negative third lens group increases, and the distance between the negative third lens group and the positive fourth lens group decreases; and the positive second lens group, the negative third lens group and the positive fourth lens group move toward the object. The wide-angle zoom lens system satisfies the following conditions:

$$1.2 < |f_{(i=1)}/f_W| < 2.0 \qquad (1)$$

$$1.5 < |f_{(i=2)}/f_W| < 2.2 \qquad (2)$$

$$2.5 < |f_{(i=3)}/f_W| < 3.6 \qquad (3)$$

$$3.2 < |f_{(i=4)}/f_W| < 4.7; \qquad (4)$$

wherein fi designates the focal length (f1<0, f3<0) of the $i^{th}$ lens group (i=1~4); and $f_W$ designates the focal length of the entire the wide-angle zoom lens system at the short focal length extremity.

8 Claims, 19 Drawing Sheets

Fig. 1
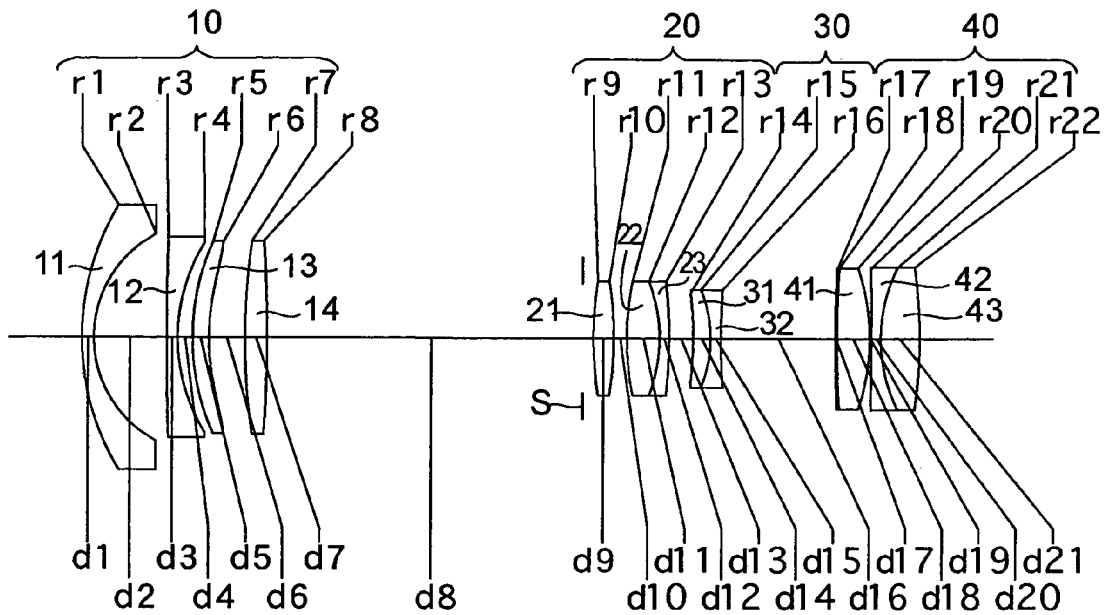
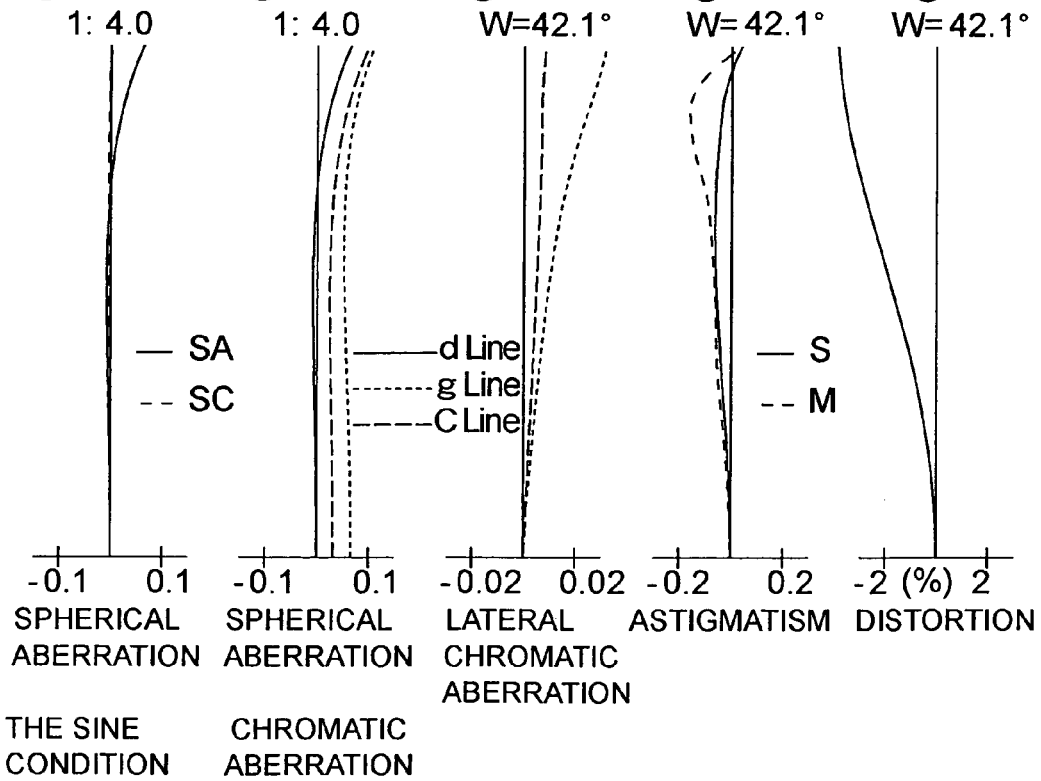
Fig. 2A 1:4.0 SPHERICAL ABERRATION THE SINE CONDITION
— SA
-- SC
Fig. 2B 1:4.0 SPHERICAL ABERRATION CHROMATIC ABERRATION
— d Line
-- g Line
--- C Line
Fig. 2C W=42.1° LATERAL CHROMATIC ABERRATION
Fig. 2D W=42.1° ASTIGMATISM
— S
-- M
Fig. 2E W=42.1° DISTORTION Fig. 3
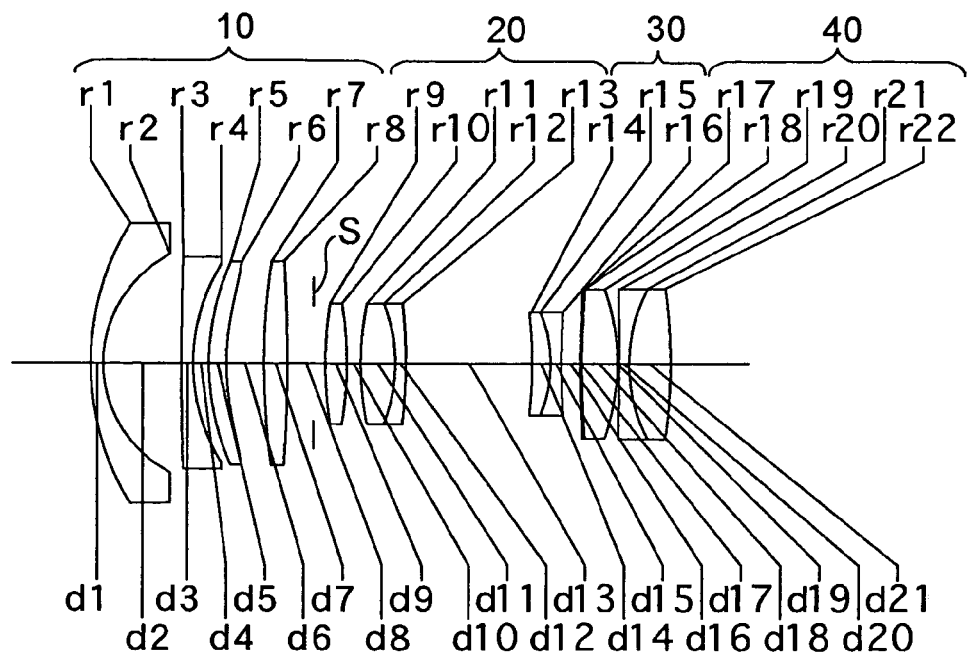
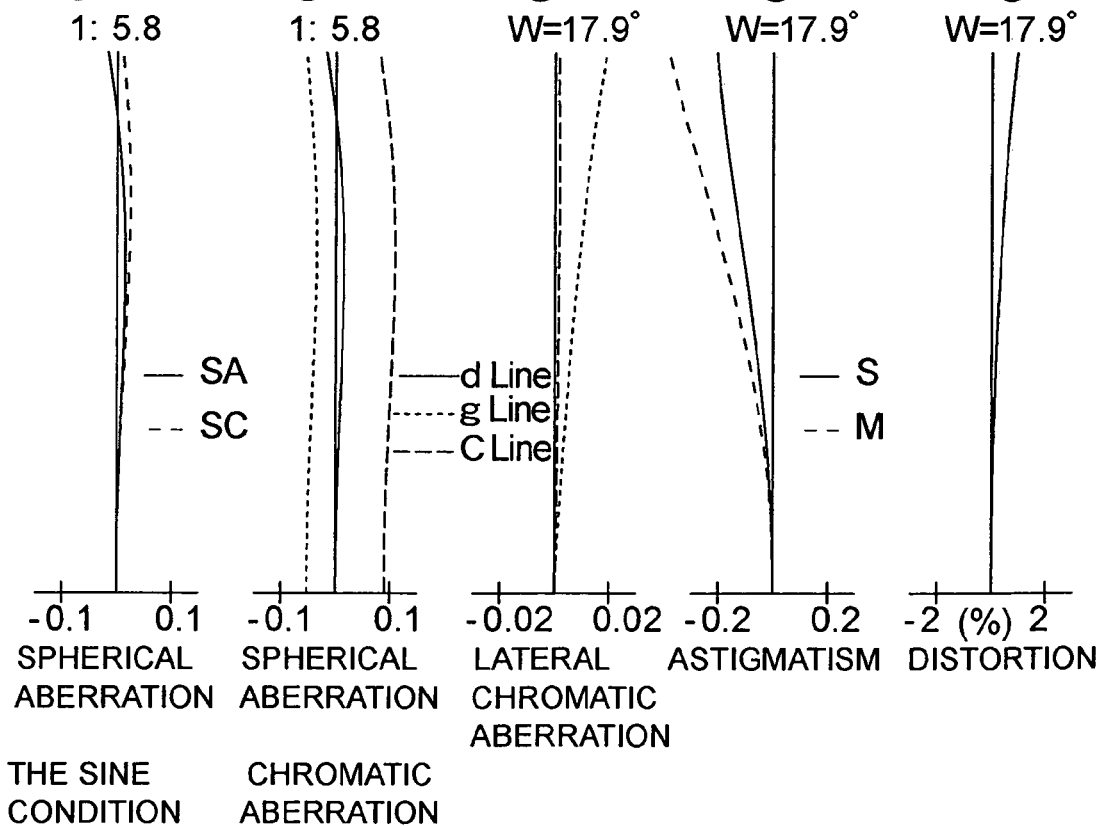

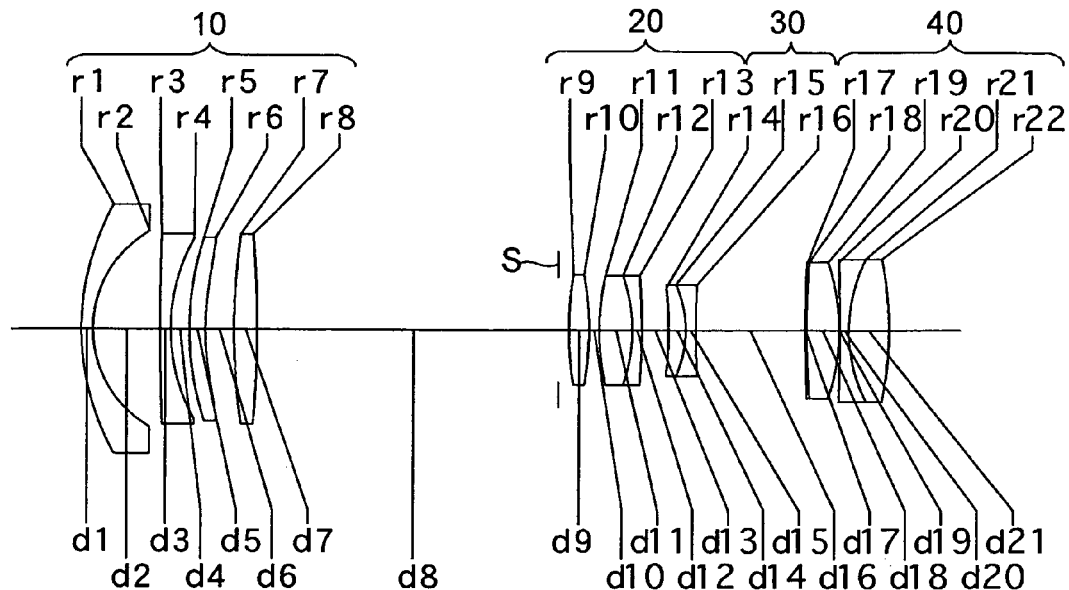
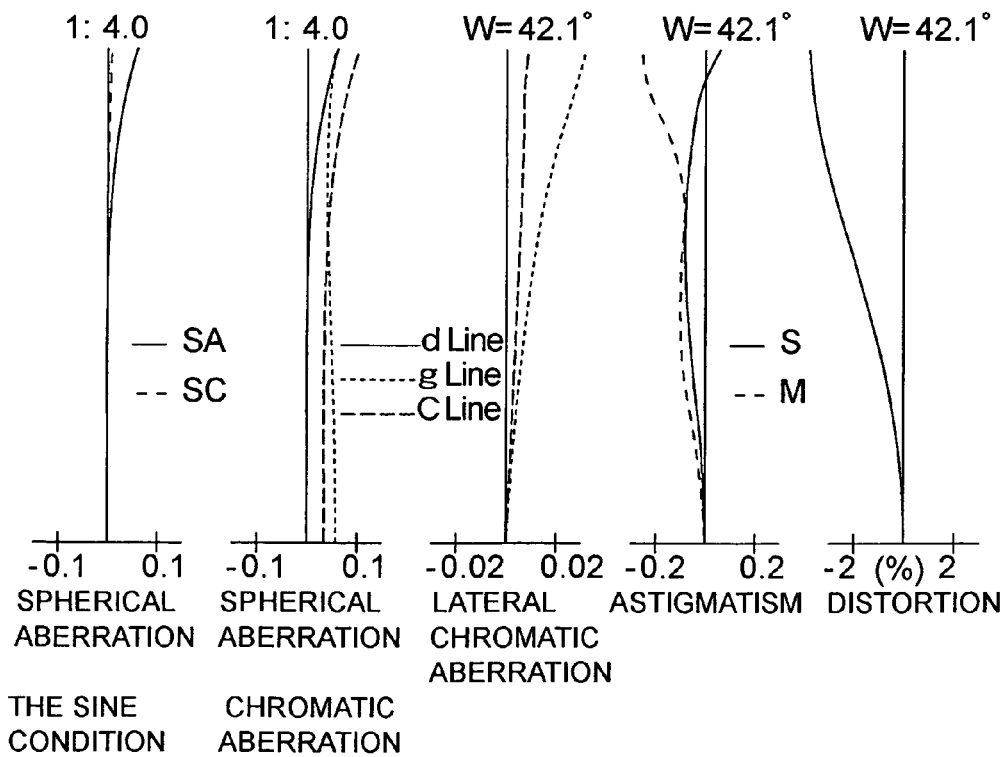

Fig. 11
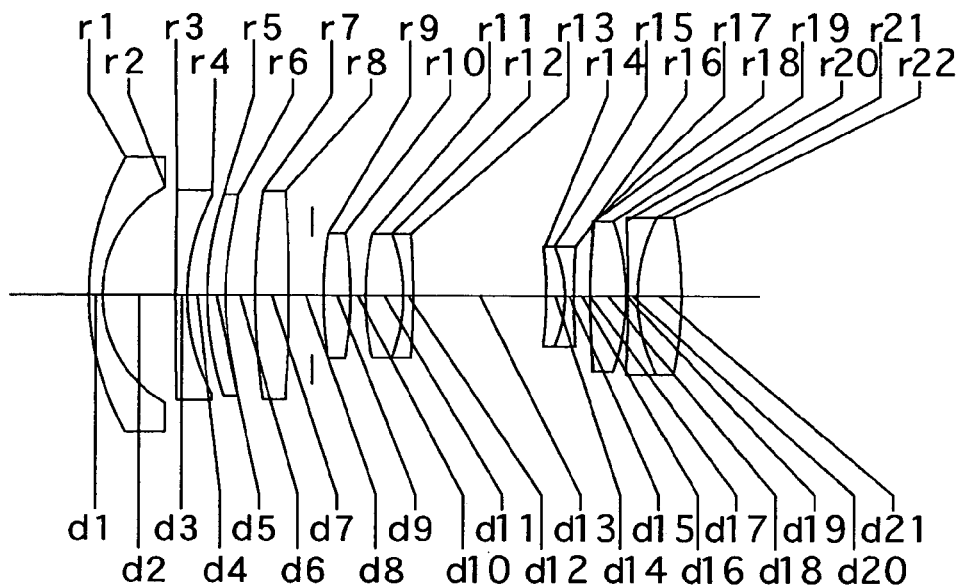
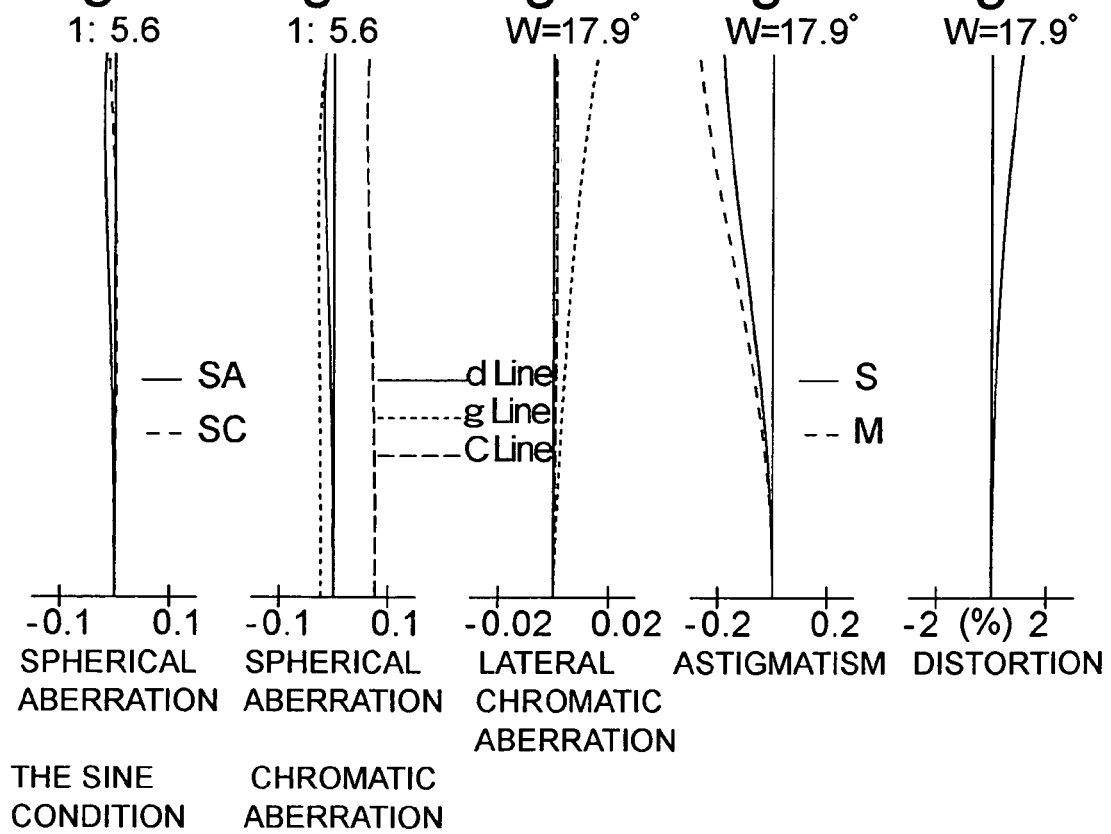

SPHERICAL ABERRATION
THE SINE CONDITION

SPHERICAL ABERRATION
CHROMATIC ABERRATION

LATERAL CHROMATIC ABERRATION

ASTIGMATISM

DISTORTION

Fig. 15
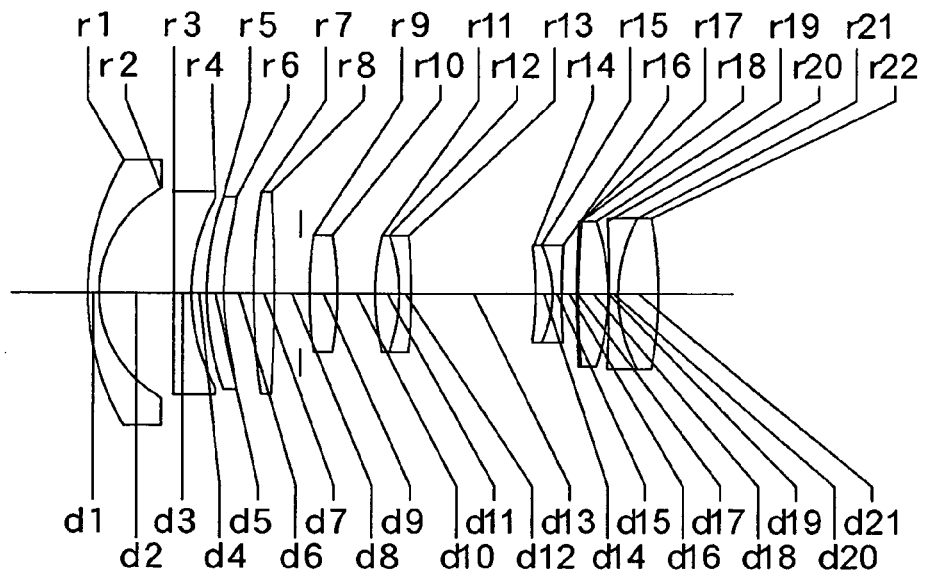
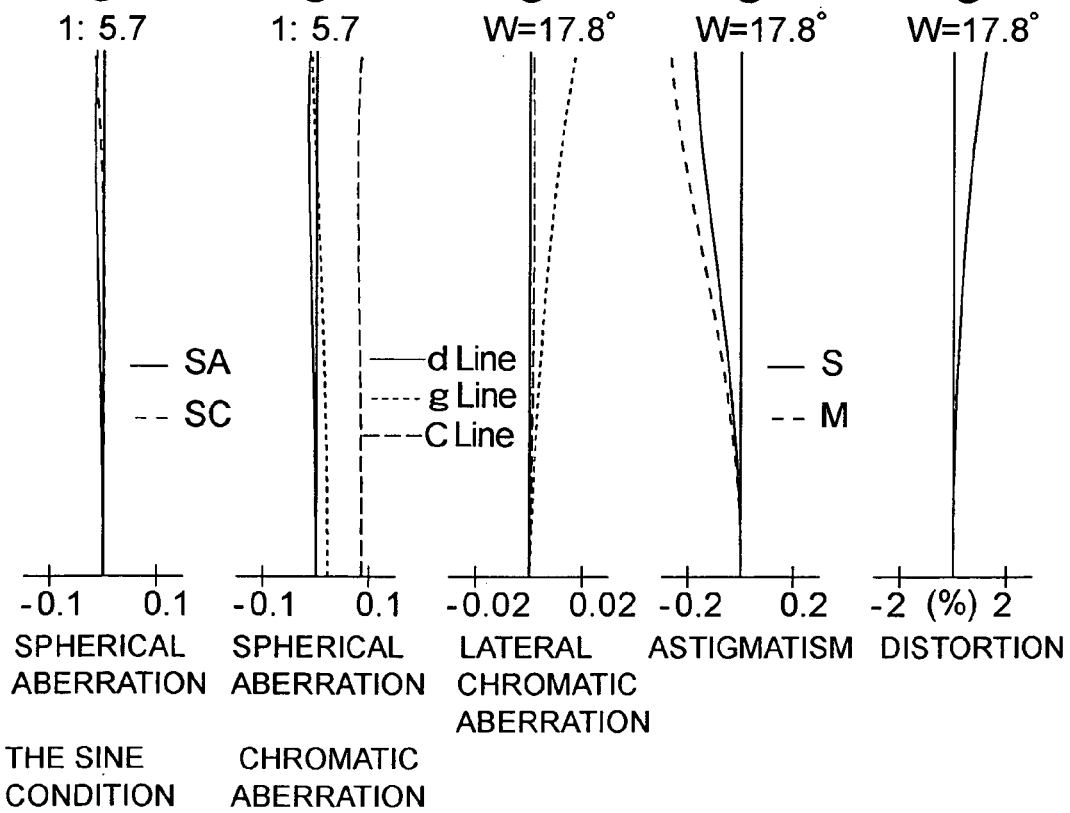

Fig. 17
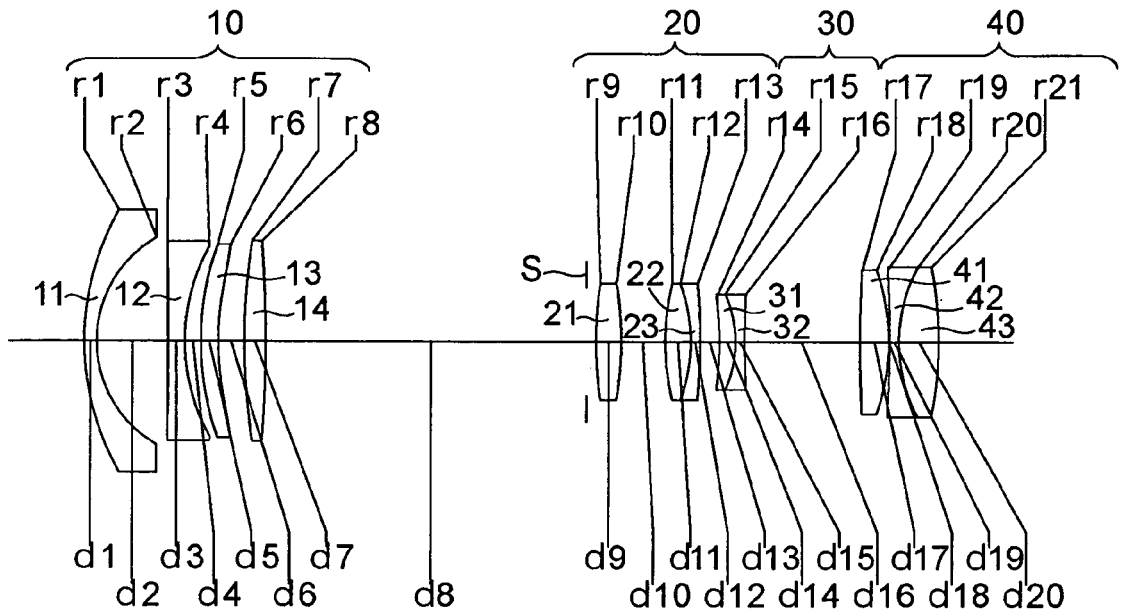
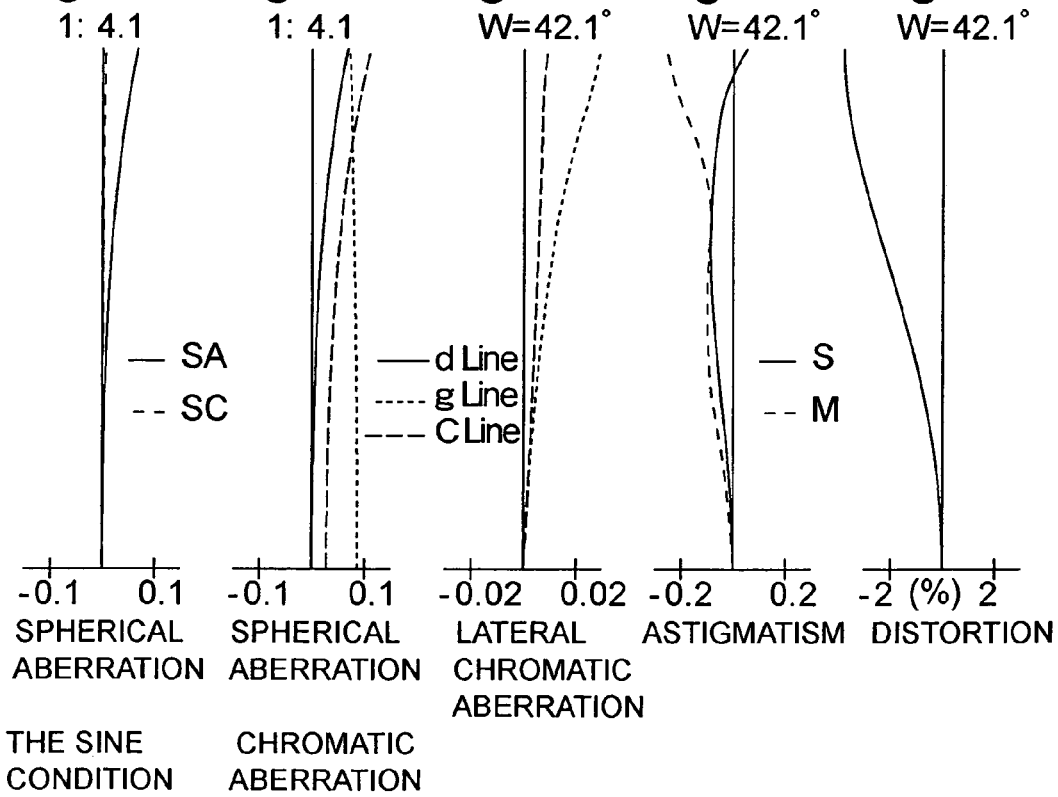
Fig.18A  Fig.18B  Fig.18C  Fig.18D  Fig.18E

Fig. 19
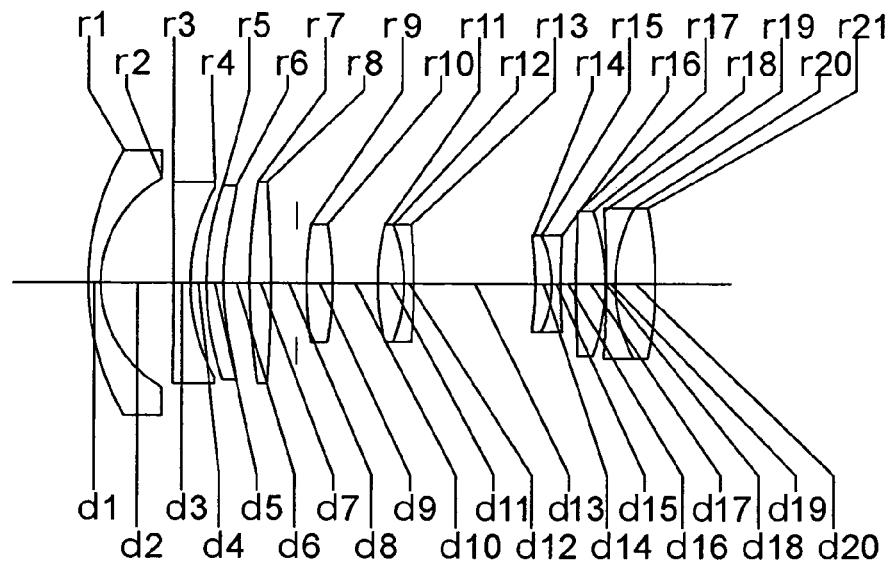
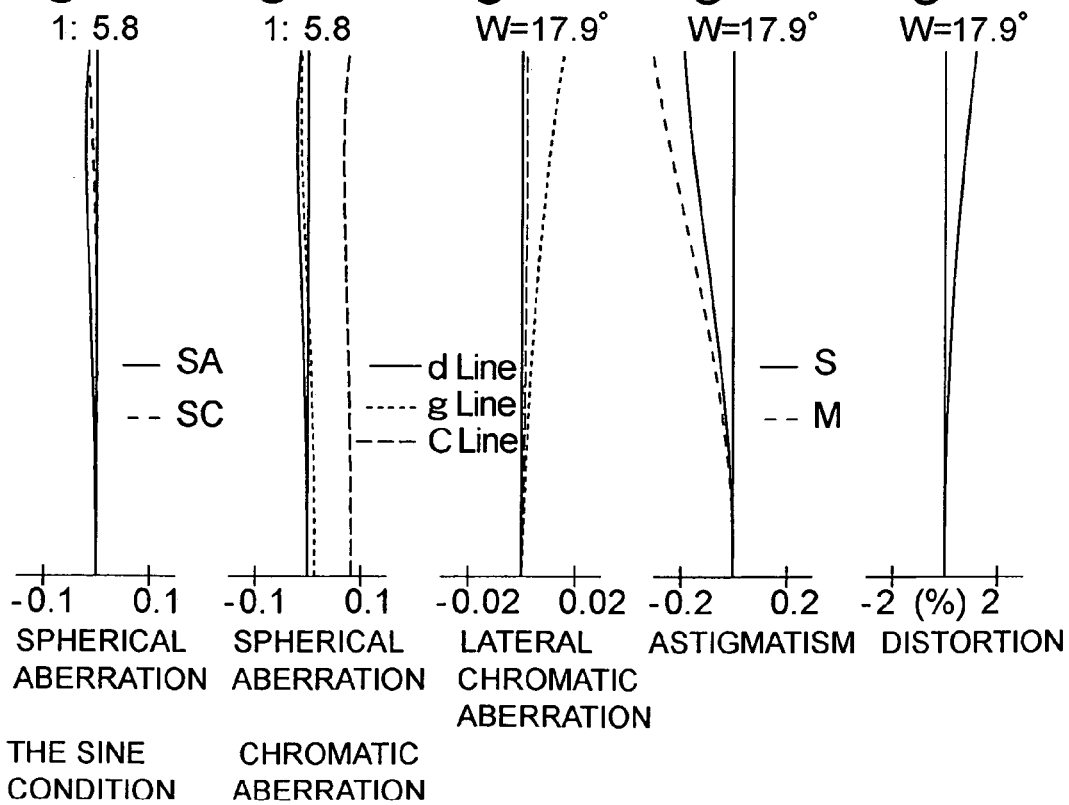
Fig.20A Fig.20B Fig.20C Fig.20D Fig.20E

Fig. 21
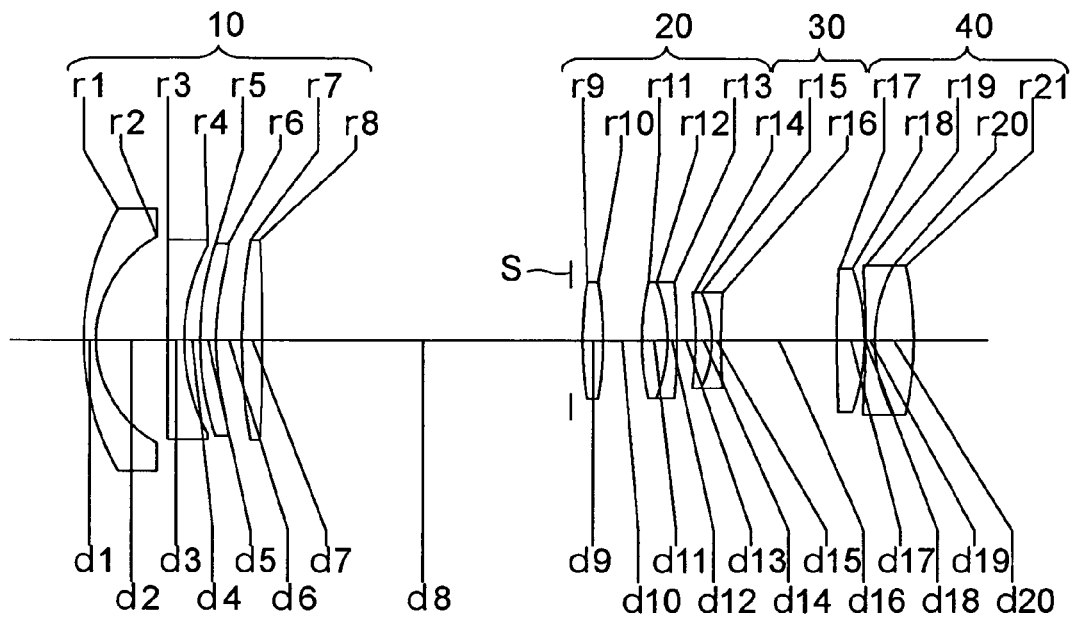
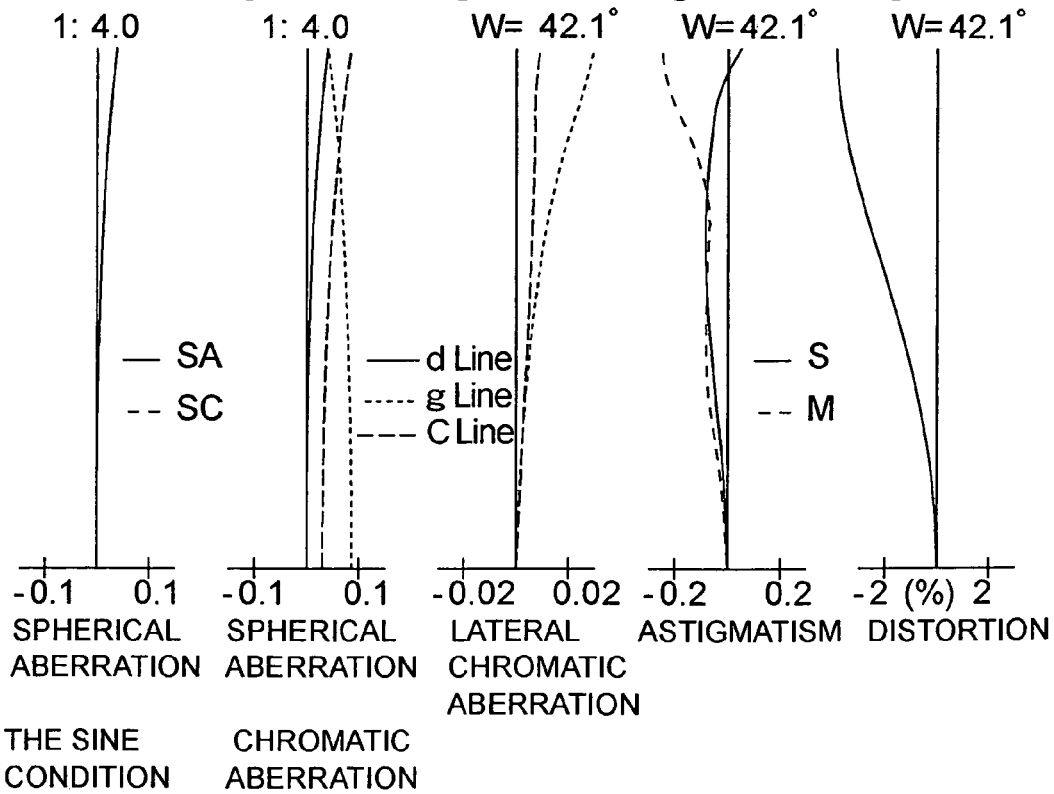
Fig.22A  Fig.22B  Fig.22C  Fig.22D  Fig.22E

Fig. 23
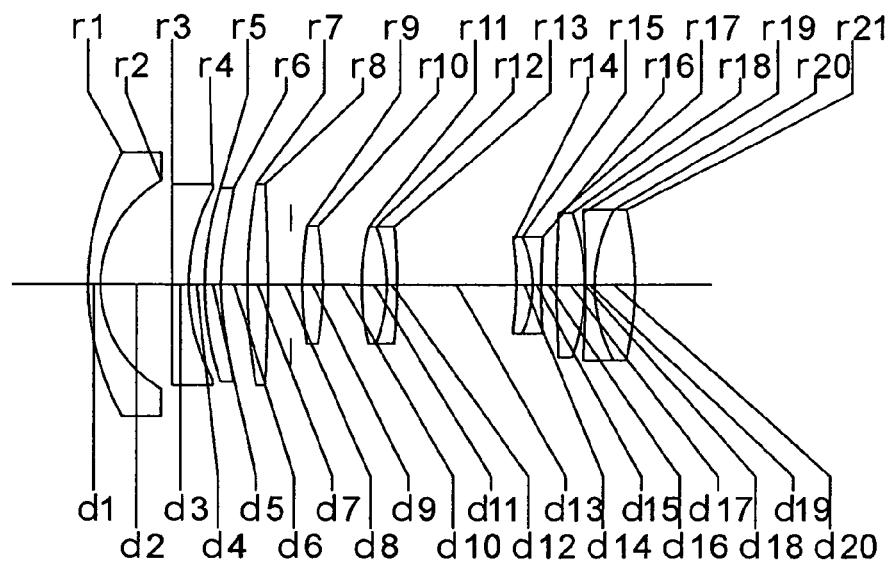
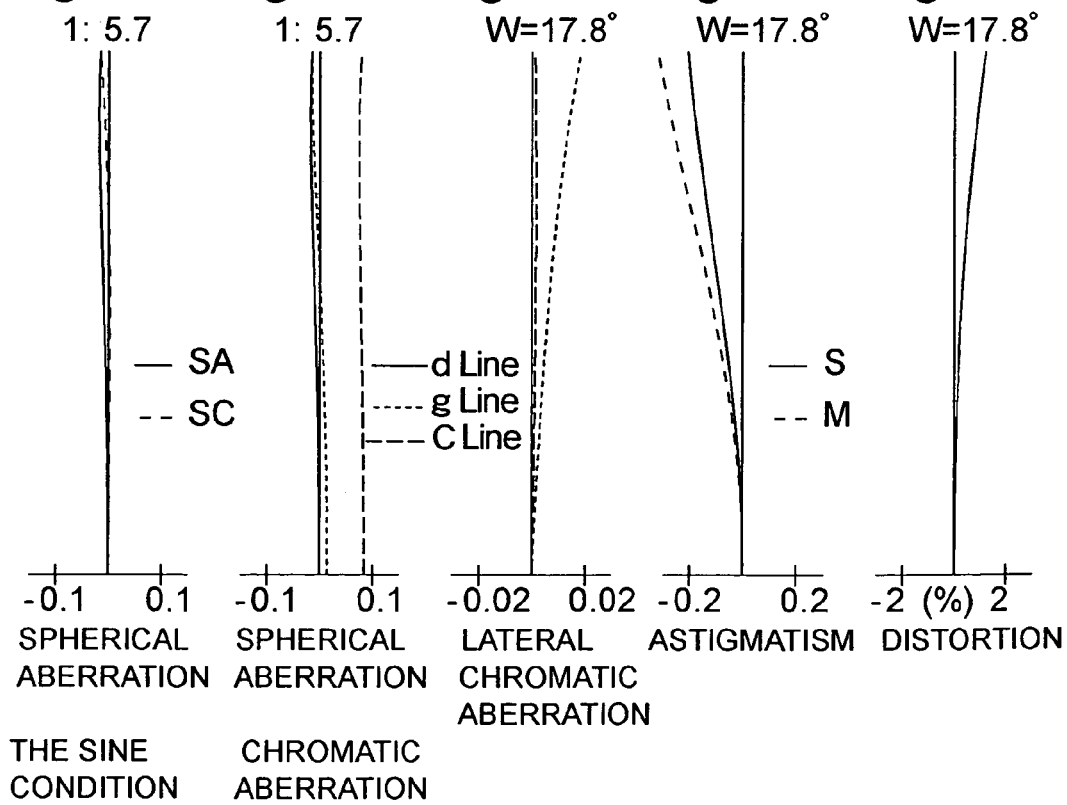
Fig.24A  Fig.24B  Fig.24C  Fig.24D  Fig.24E

Fig. 25
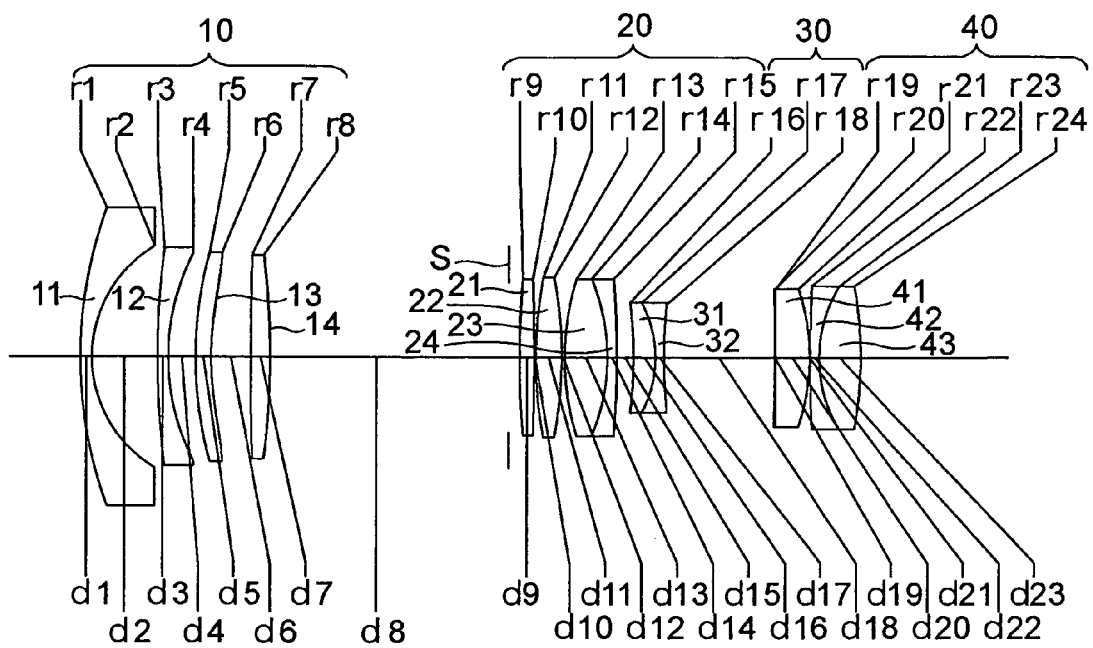
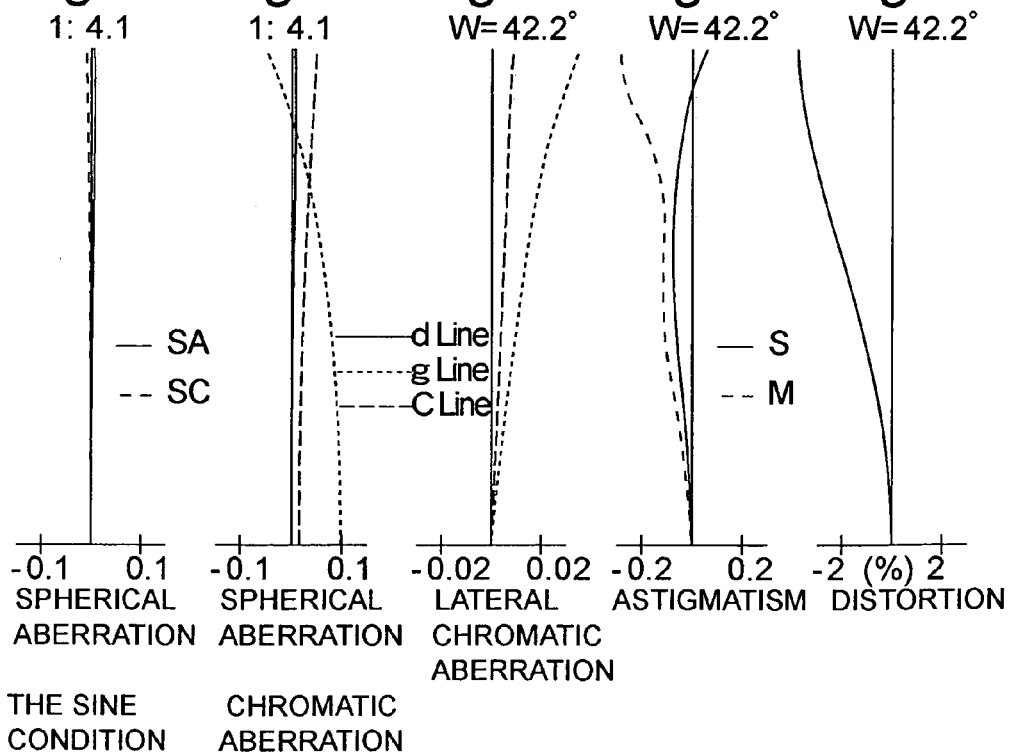
Fig.26A  Fig.26B  Fig.26C  Fig.26D  Fig.26E
1: 4.1   1: 4.1   W=42.2°  W=42.2°  W=42.2°
— SA
-- SC
— d Line
···· g Line
—- C Line
— S
-- M
-0.1  0.1    -0.1  0.1    -0.02  0.02    -0.2  0.2    -2 (%) 2
SPHERICAL    SPHERICAL    LATERAL         ASTIGMATISM  DISTORTION
ABERRATION   ABERRATION   CHROMATIC
                          ABERRATION
THE SINE     CHROMATIC
CONDITION    ABERRATION Fig. 27
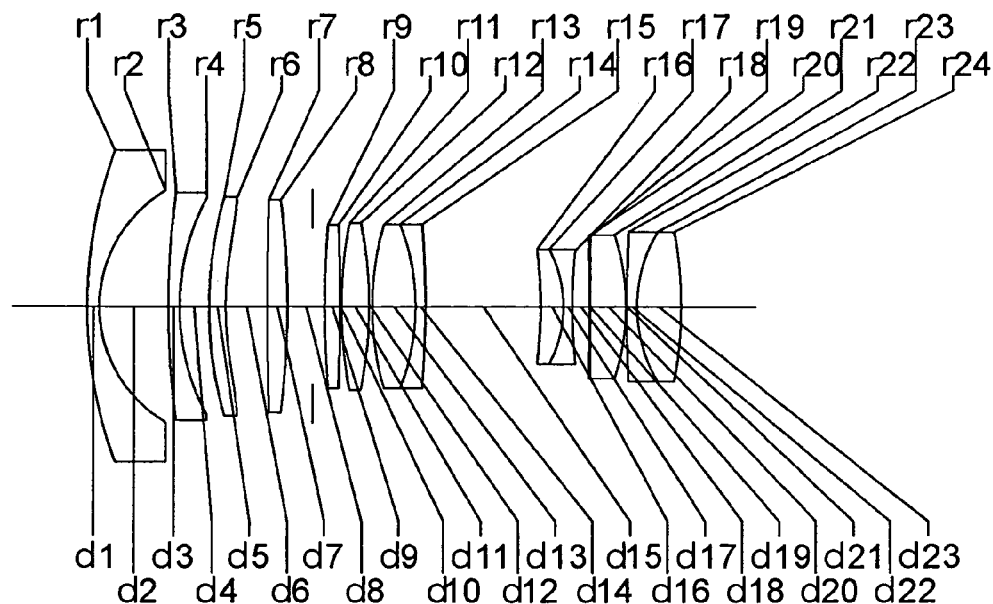
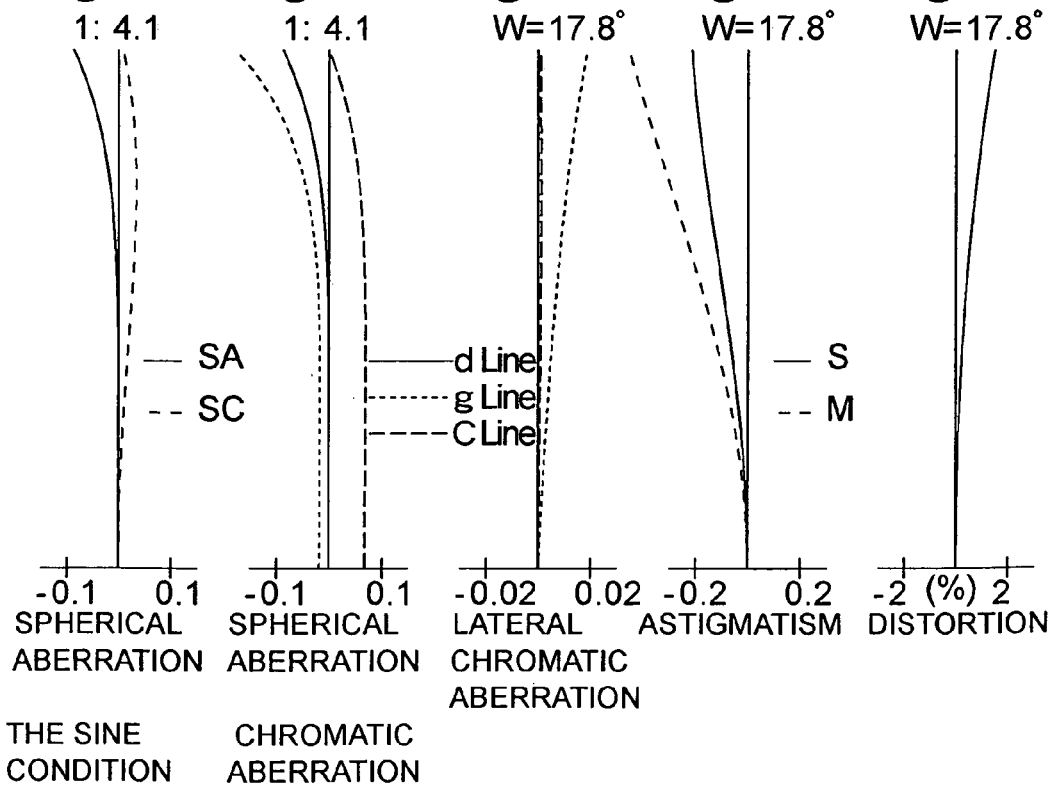
Fig.28A  Fig.28B  Fig.28C  Fig.28D  Fig.28E Fig. 29
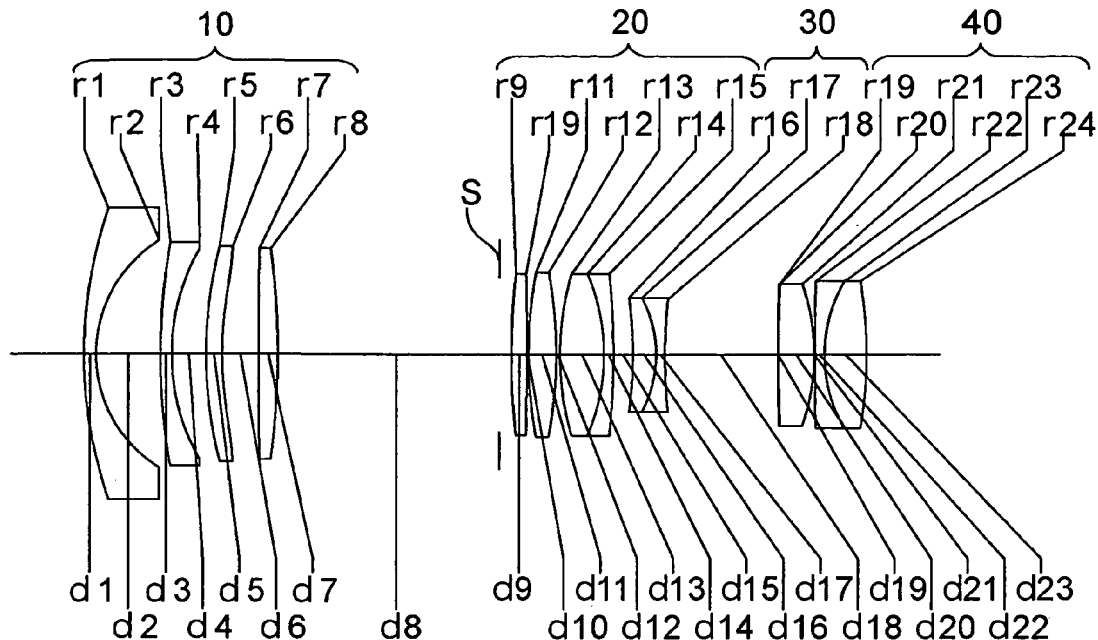
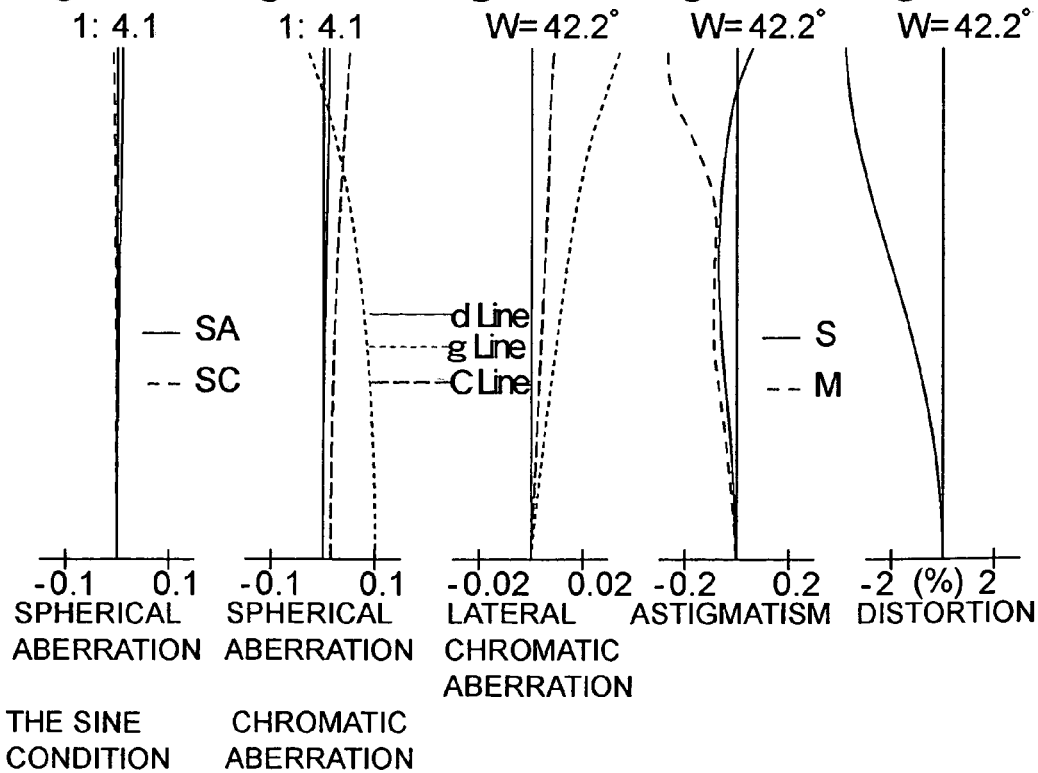
Fig.30A  Fig.30B  Fig.30C  Fig.30D  Fig.30E Fig. 33
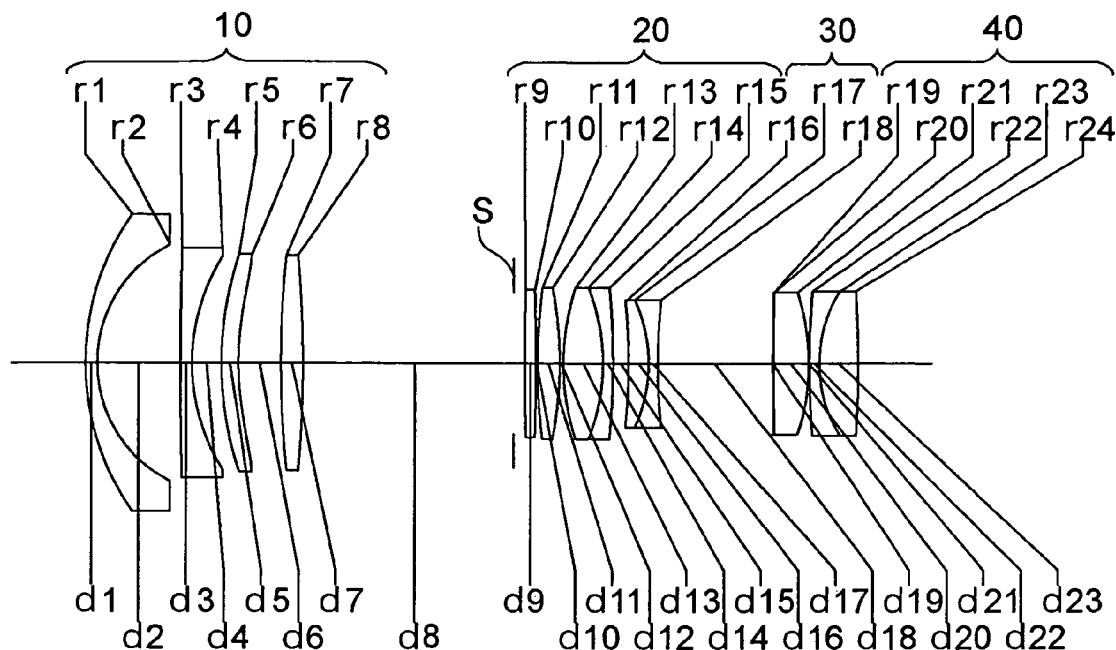
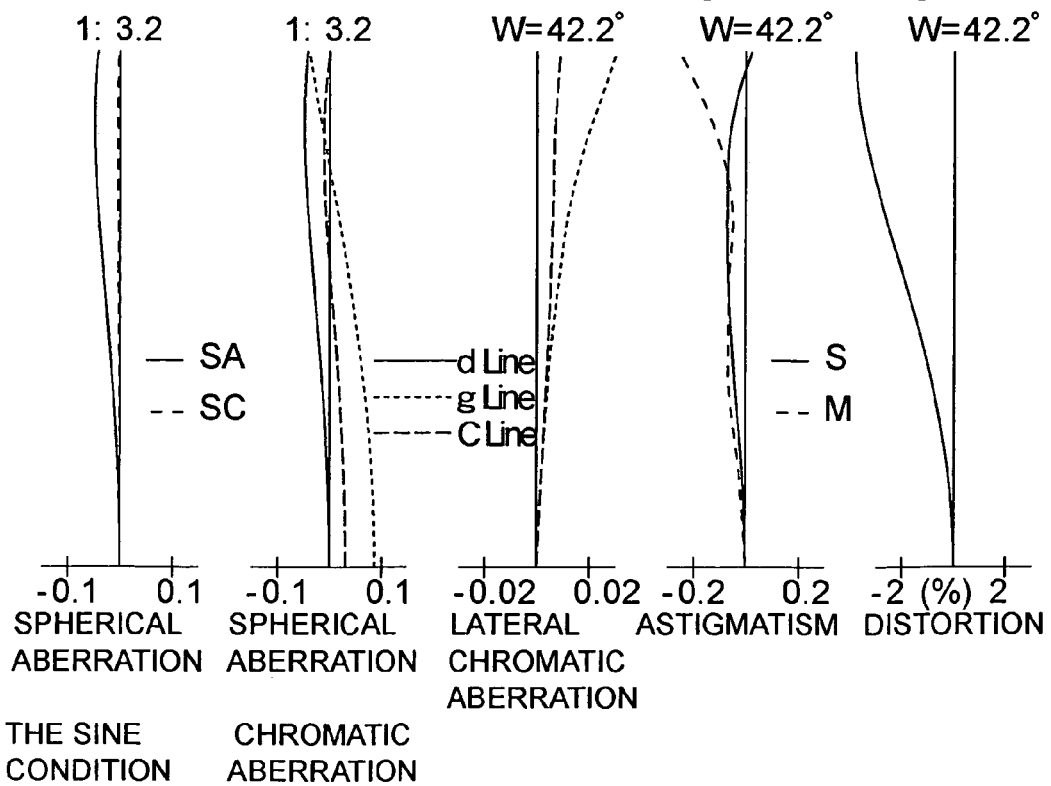
Fig.34A   Fig.34B   Fig.34C   Fig.34D   Fig.34E Fig. 35
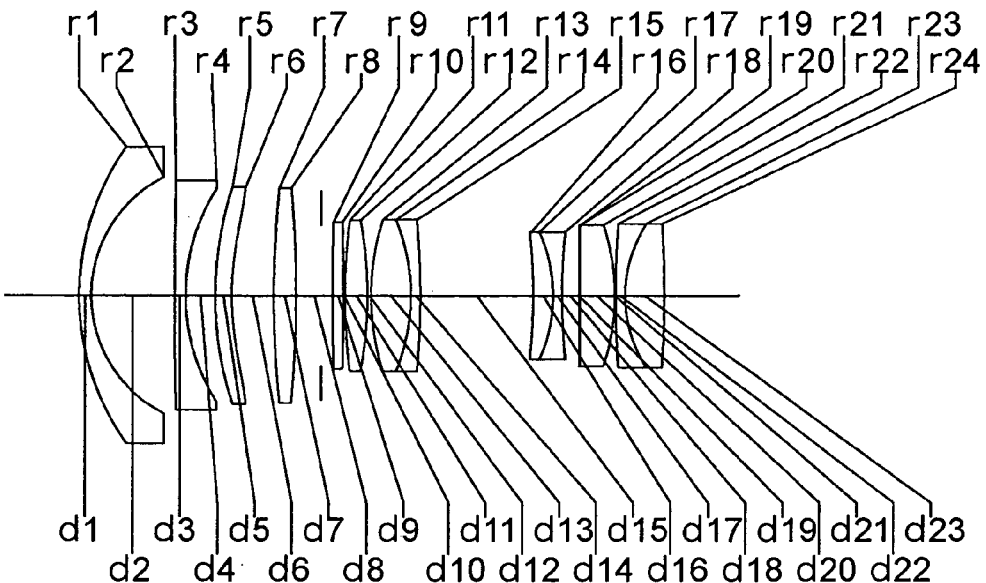
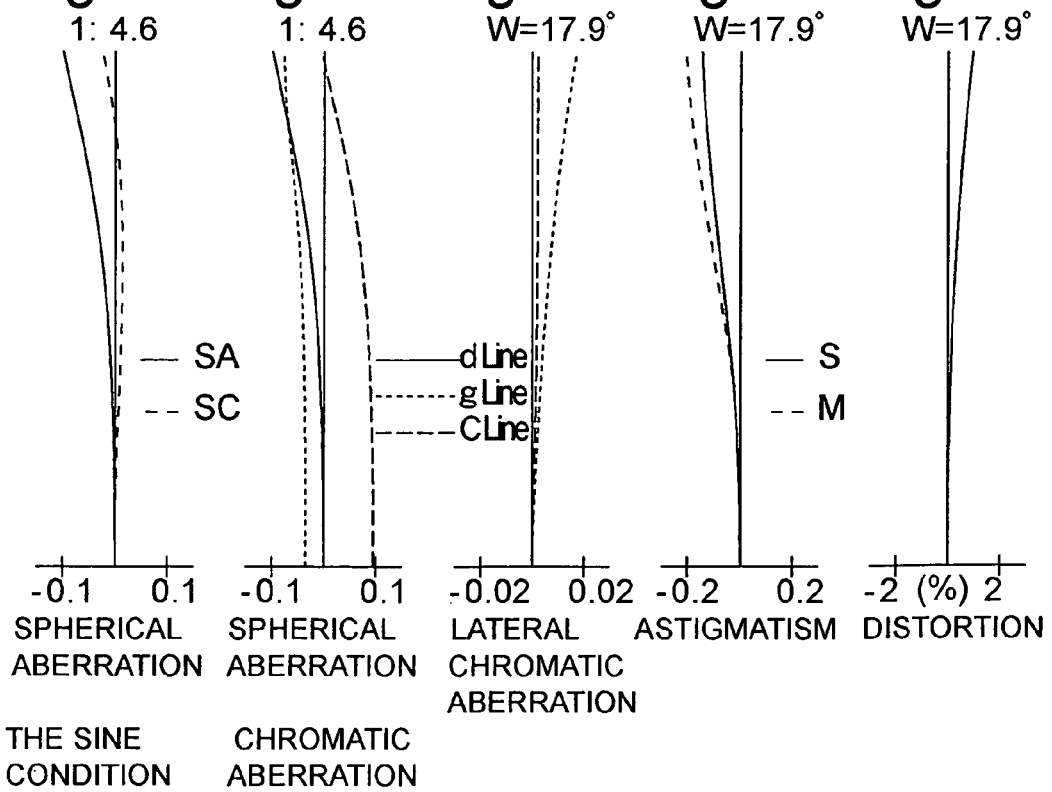
Fig.36A  Fig.36B  Fig.36C  Fig.36D  Fig.36E
1: 4.6    1: 4.6    W=17.9°  W=17.9°  W=17.9°
SPHERICAL   SPHERICAL   LATERAL        ASTIGMATISM   DISTORTION
ABERRATION  ABERRATION  CHROMATIC
                        ABERRATION
THE SINE    CHROMATIC
CONDITION   ABERRATION

WIDE-ANGLE ZOOM LENS SYSTEM

BACKGROUND OF THE INVENTION

1. Field of the Invention

The present invention relates to a wide-angle zoom lens system suitable for a single lens reflex (SLR) camera, and relates to a wide-angle zoom lens system suitable for a digital SLR camera using a small imaging device (e.g., a CCD) which is smaller than a Leica-format size.

2. Description of the Prior Art

A CCD, having a Leica image-format size (36 mm×24 mm; hereinafter, the Leica-format size) which is the most widely-used format size in a SLR camera in which a silver halide film is used, is very expensive. Accordingly, a CCD having a format size which is about 0.7 times as large as the Leica-format size with respect to the image-height ratio is frequently used in a digital single reflex camera. Therefore if the format size becomes smaller, a lens system having a shorter focal length is required in order to achieve a wider angle-of-view.

A wide-angle zoom lens system which achieves an angle-of-view of 80 degrees or more at the short focal length extremity has already been available in the market; however, the zoom ratio is only about 2.0. The wide-angle zoom lens systems disclosed in Japanese Unexamined Patent Publications No. 2001-318314 and 2001-83421 are examples of such a zoom lens system. Furthermore, the zoom lens systems disclosed in Japanese Unexamined Patent Publications No.2000-338397 and Hei-11-174328 have a zoom ratio of about 3.0; however, the angle-of-view is not sufficiently secured.

SUMMARY OF THE INVENTION

The present invention provides a wide-angle zoom lens system for a digital single lens reflex (SLR) camera having an image pick-up surface size of 14.24 mm with respect to a diagonal image height; and, more specifically, the wide-angle zoom lens system has an angle-of-view of 80° or more at the short focal length extremity, and has a zoom ratio exceeding 2.5.

According to an aspect of the present invention, there is provided a wide-angle zoom lens system including a first lens group having a negative refractive power (hereinafter, a negative first lens group), a second lens group having a positive refractive power (hereinafter, a positive second lens group), a third lens group having a negative refractive power (hereinafter, a negative third lens group), and a fourth lens group having a positive refractive power (hereinafter, a positive fourth lens group), in this order from the object.

Upon zooming from the short focal length extremity to the long focal length extremity, the distance between the negative first lens group and the positive second lens group decreases, the distance between the positive second lens group and the negative third lens group increases, and the distance between the negative third lens group and the positive fourth lens group decreases; and the positive second lens group, the negative third lens group and the positive fourth lens group are arranged to move toward the object. The wide-angle zoom lens system satisfies the following conditions:

$$1.2 < |f_{(i=1)}/f_W| < 2.0 \quad (1)$$

$$1.5 < f_{(i=2)}/f_W < 2.2 \quad (2)$$

$$2.5 < |f_{(i=3)}/f_W| < 3.6 \quad (3)$$

$$3.2 < f_{(i=4)}/f_W < 4.7; \quad (4)$$

wherein fi designates the focal length ($f_{(i=1)} < 0$, $f_{(i=3)} < 0$) of the $i^{th}$ lens group (i=1~4); and $f_W$ designates the focal length of the entire the wide-angle zoom lens system at the short focal length extremity.

The positive second lens group and the positive fourth lens group are arranged to be integrally movable. The integral movement of these lens groups can make the mechanism of the wide-angle zoom lens system simpler, and can reduce errors due to decentration.

The wide-angle zoom lens system preferably satisfies the following condition:

$$1.05 < TL_w/TL_t < 1.30 \quad (5)$$

wherein $TL_w$ designates the distance from the most object-side surface of the negative first lens group to the image plane at the short focal length extremity; and $TL_t$ designates the distance from the most object-side surface of the negative first lens group to the image plane at the long focal length extremity.

The negative first lens group can include at least one lens element having an aspherical surface thereon, so that astigmatism and distortion particularly at the short focal length extremity are suitably corrected.

The positive fourth lens group can include at least one positive lens element and at least one negative lens element, and the most object-side surface of the positive fourth lens group is preferably made aspherical. Due to this arrangement, the correcting of aberrations over the entire zooming range becomes easier.

A diaphragm can be provided on the object side of the positive second lens group, and can be arranged to move together with the positive second lens group upon zooming. Due to this arrangement, telecentricity can be enhanced.

If an attempt is made to provide a positive lens element having a convex surface facing toward the image as the most image-side lens element of the positive fourth lens group, telecentricity can be enhanced.

Furthermore, upon zooming from the short focal length extremity to the long focal length extremity, the positive first lens group is preferably arranged to initially move toward the image, and thereafter to move toward the object.

The present disclosure relates to subject matter contained in Japanese Patent Application No. 2003-128211 (filed on May 6, 2003) which is expressly incorporated herein in its entirety.

BRIEF DESCRIPTION OF THE DRAWINGS

The present invention will be discussed below in detail with reference to the accompanying drawings, in which:

FIG. 1 is a lens arrangement of the wide-angle zoom lens system at the short focal length extremity, according to a first embodiment of the present invention;

FIGS. 2A, 2B, 2C, 2D and 2E show aberrations occurred in the lens arrangement shown in FIG. 1;

FIG. 3 is a lens arrangement of the wide-angle zoom lens system, shown in FIG. 1, at the long focal length extremity;

FIGS. 4A, 4B, 4C, 4D and 4E show aberrations occurred in the lens arrangement shown in FIG. 3;

FIG. 5 is a lens arrangement of the wide-angle zoom lens system at the short focal length extremity, according to a second embodiment of the present invention;

FIGS. 6A, 6B, 6C, 6D and 6E show aberrations occurred in the lens arrangement shown in FIG. 5;

FIG. 11 is a lens arrangement of the wide-angle zoom lens system, shown in FIG. 9, at the long focal length extremity;

FIGS. 12A, 12B, 12C, 12D and 12E show aberrations occurred in the lens arrangement shown in FIG. 11;

FIG. 15 is a lens arrangement of the wide-angle zoom lens system, shown in FIG. 13, at the long focal length extremity;

FIGS. 16A, 16B, 16C, 16D and 16E show aberrations occurred in the lens arrangement shown in FIG. 15;

FIG. 17 is a lens arrangement of the wide-angle zoom lens system at the short focal length extremity, according to a fifth embodiment of the present invention;

FIGS. 18A, 18B, 18C, 18D and 18E show aberrations occurred in the lens arrangement shown in FIG. 17;

FIG. 19 is a lens arrangement of the wide-angle zoom lens system, shown in FIG. 17, at the long focal length extremity;

FIGS. 20A, 20B, 20C, 20D and 20E show aberrations occurred in the lens arrangement shown in FIG. 19;

FIG. 21 is a lens arrangement of the wide-angle zoom lens system at the short focal length extremity, according to a sixth embodiment of the present invention;

FIGS. 22A, 22B, 22C, 22D and 22E show aberrations occurred in the lens arrangement shown in FIG. 21;

FIG. 23 is a lens arrangement of the wide-angle zoom lens system, shown in FIG. 21, at the long focal length extremity;

FIGS. 24A, 24B, 24C, 24D and 24E show aberrations occurred in the lens arrangement shown in FIG. 23;

FIG. 25 is a lens arrangement of the wide-angle zoom lens system at the short focal length extremity, according to a seventh embodiment of the present invention;

FIGS. 26A, 26B, 26C, 26D and 26E show aberrations occurred in the lens arrangement shown in FIG. 25;

FIG. 27 is a lens arrangement of the wide-angle zoom lens system, shown in FIG. 25, at the long focal length extremity;

FIGS. 28A, 28B, 28C, 28D and 28E show aberrations occurred in the lens arrangement shown in FIG. 27;

FIG. 29 is a lens arrangement of the wide-angle zoom lens system at the short focal length extremity, according to an eighth embodiment of the present invention;

FIGS. 30A, 30B, 30C, 30D and 30E show aberrations occurred in the lens arrangement shown in FIG. 29;

FIG. 33 is a lens arrangement of the wide-angle zoom lens system at the short focal length extremity, according to a ninth embodiment of the present invention;

FIGS. 34A, 34B, 34C, 34D and 34E show aberrations occurred in the lens arrangement shown in FIG. 33;

FIG. 35 is a lens arrangement of the wide-angle zoom lens system, shown in FIG. 33, at the long focal length extremity;

FIGS. 36A, 36B, 36C, 36D and 36E show aberrations occurred in the lens arrangement shown in FIG. 35.

DESCRIPTION OF THE PREFERRED EMBODIMENTS

The present invention relates to a wide-angle zoom lens system (i) having a long back focal distance, (ii) including a negative lens group, a positive lens group, a negative lens group and a positive lens group, in this order from the object, and (iii) achieving a zoom ratio of more than 2.5.

Figure 37:
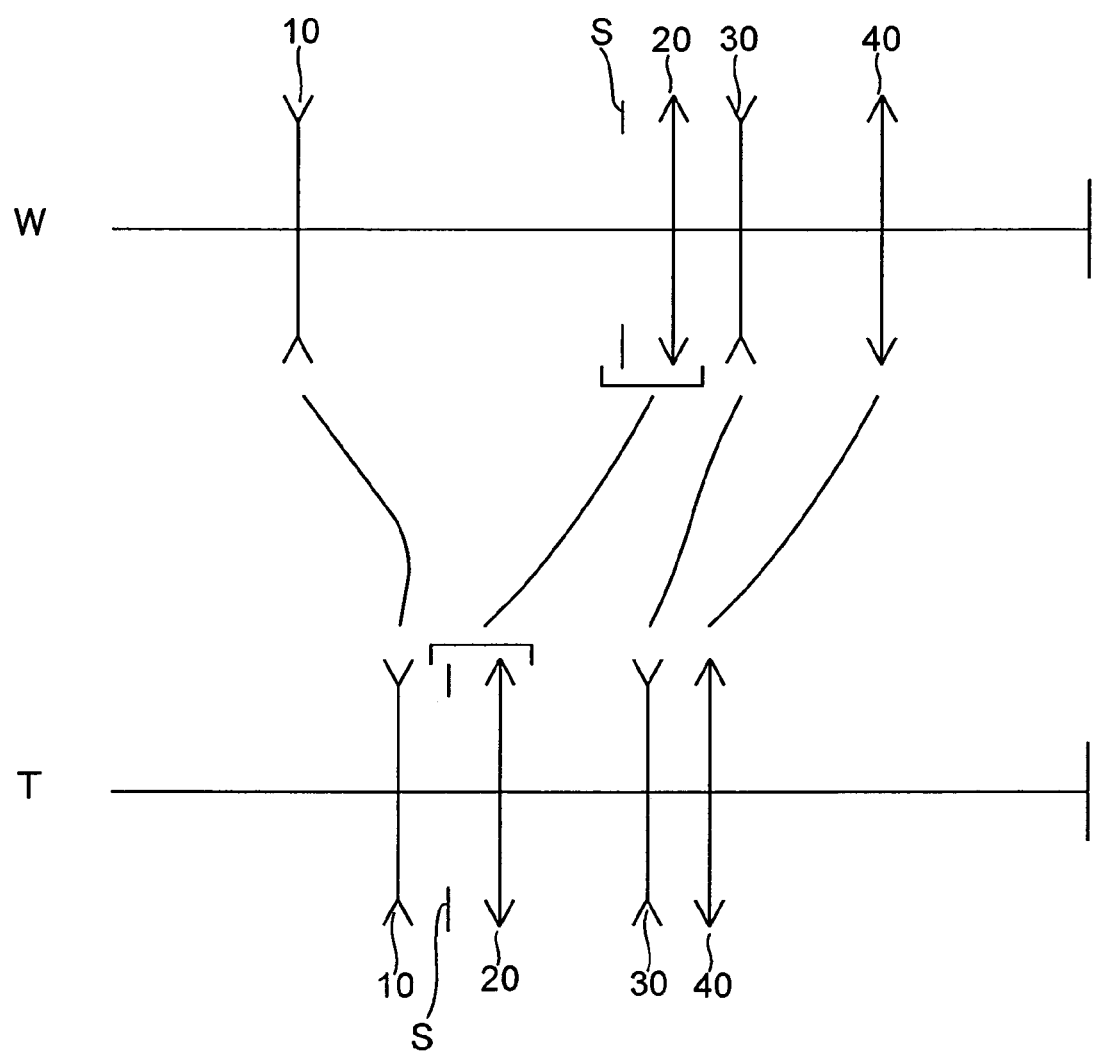
FIG. 37 shows lens-group moving paths upon zooming, with respect to the wide-angle zoom lens system according to the present invention.

As shown in the lens-group moving paths of FIG. 37, the wide-angle zoom lens system according to the present invention includes a negative first lens group 10, a positive second lens group 20, a negative third lens group 30 and a positive fourth lens group 40, in this order from the object.

Upon zooming from the short focal length extremity (W) to the long focal length extremity (T), the distance between the negative first lens group 10 and the positive second lens group 20 decreases, the distance between the positive second lens group 20 and the negative third lens group 30 increases, and the distance between the negative third lens group 30 and the positive fourth lens group 40 decreases; and the positive second lens group 20, the negative third lens group 30, and the positive fourth lens group 40 are arranged to move toward the object.

Furthermore, upon zooming from the short focal length extremity (W) to the long focal length extremity (T), the positive first lens group 10 is arranged to initially move toward the image, and thereafter to move toward the object.

The overall length of the wide-angle zoom lens system at the short focal length extremity is longer than the overall length thereof at the long focal length extremity.

Focusing is performed with the negative first lens group 10.

The positive second lens group 20 and the positive fourth lens group 40 are arranged to be integrally movable. The integral movement of these lens groups can make the mechanism of the wide-angle zoom lens system simpler, and can reduce errors due to decentration.

A diaphragm S is provided in front (on the object side) of the positive second lens group 20, and moves together with the positive second lens group 20.

Condition (1) determines the focal length (refractive power) of the negative first lens group 10.

If the focal length of the negative first lens group 10 becomes shorter, i.e., the refractive power thereof becomes stronger, to the extent that $|f_{(i=1)}/f_W|$ exceeds the lower limit of condition (1), the overall length of the wide-angle zoom lens system at the short focal length extremity can be made shorter; however, coma and distortion become larger.

If the focal length of the negative first lens group 10 becomes longer, i.e., the refractive power thereof becomes weaker, to the extent that $|f_{(i=1)}/f_W|$ exceeds the upper limit of condition (1), the traveling distance of the negative first lens group 10 upon zooming becomes longer, so that the overall length of the wide-angle zoom lens system becomes longer.

Condition (2) determines the focal length (refractive power) of the positive second lens group 20.

If the focal length of the positive second lens group 20 becomes shorter, i.e., the refractive power thereof becomes stronger, to the extent that $f_{(i=2)}/f_W$ exceeds the lower limit of condition (2), the amount of change in aberrations upon zooming becomes larger.

If the focal length of the positive second lens group 20 becomes longer, i.e., the refractive power thereof becomes weaker, to the extent that $f_{(i=2)}/f_W$ exceeds the upper limit of condition (2), it becomes difficult to secure an adequate zoom ratio.

Condition (3) determines the focal length (refractive power) of the negative third lens group 30.

If the focal length of the negative third lens group 30 becomes shorter, i.e., the refractive power thereof becomes stronger, to the extent that $|f_{(i=3)}/f_W|$ exceeds the lower limit of condition (3), spherical aberration is over-corrected, and coma becomes larger.

If the focal length of the negative third lens group 30 becomes longer, i.e., the refractive power thereof becomes weaker, to the extent that $|f_{(i=3)}/f_W|$ exceeds the upper limit of condition (3), the traveling distance of the negative third lens group 30 upon zooming becomes longer, so that the overall length of the wide-angle zoom lens system becomes longer.

Condition (4) determines the focal length (refractive power) of the positive fourth lens group 40.

If the focal length of the positive fourth lens group 40 becomes shorter, i.e., the refractive power thereof becomes stronger, to the extent that $f_{(i=4)}/f_W$ exceeds the lower limit of condition (4), coma and astigmatism become larger, so that it becomes difficult to obtain a longer back focal distance.

If the focal length of the positive fourth lens group 40 becomes longer, i.e., the refractive power thereof becomes weaker, to the extent that $f_{(i=4)}/f_W$ exceeds the upper limit of condition (4), the correcting of astigmatism and coma cannot be sufficiently made.

The wide-angle zoom lens system of the present invention preferably satisfies the following conditions instead of the above-explained conditions (1) through (4):

$$1.4 < |f_{(i=1)}/f_W| < 1.8 \quad (1')$$

$$1.7 < f_{(i=2)}/f_W < 2.0 \quad (2')$$

$$2.7 < |f_{(i=3)}/f_W| < 3.0 \quad (3')$$

$$3.4 < f_{(i=4)}/f_W < 4.3 \quad (4')$$

Condition (5) determines the traveling distance of the negative first lens group 10.

If $TL_W/TL_t$ exceeds the lower limit of condition (5), the amount of advancement of the negative first lens group 10 at the short focal length extremity becomes insufficient, and it becomes difficult to secure the back focal distance and to correct aberrations. Here, note that the amount of advancement of the negative first lens group 10 is defined as the traveling distance of the negative first lens group 10 from the position where the distance between the most object-side surface of the negative first lens group 10 and the image plane is minimum.

If $TL_W/TL_t$ exceeds the upper limit of condition (5), the amount of advancement of the negative first lens group 10 at the short focal length extremity becomes too long, so that the diameter of the negative first lens group 10 has to be made larger to collect peripheral illumination.

In the wide-angle zoom lens system of the present invention, by providing at least one aspherical surface in the negative first lens group 10, astigmatism and distortion particularly at the short focal length extremity are suitably corrected.

A lens element having an aspherical surface can be formed as either one of a glass-molded lens element, a resin molded lens element, and a hybrid lens element in which an aspherical layer of resin material is bonded onto a spherical surface of a glass lens element.

In order to suitably correct spherical aberration and coma over the entire zooming range, it is effective to provide an aspherical surface in lens groups behind the positive second lens group 20.

Furthermore, in order to correct aberrations in a well balanced manner at the short focal length extremity at which an angle-of-view is wide, it is effective to provide an aspherical surface in the positive fourth lens group 40.

Still further, in order to reduce occurrence of chromatic aberration upon zooming, it is necessary for the positive fourth lens group 40 to include both a positive lens element and a negative lens element.

Furthermore, in order to easily perform the correcting of aberrations over the entire zooming range, it is preferable to provide an aspherical surface on the most object-side surface of the positive fourth lens group 40 under the condition that the positive second lens group 20 and the positive fourth lens group 40 are arranged to move integrally.

An aspherical lens element, in general, is largely influenced by decentration due to the complicated shape of an aspherical lens element, than a spherical lens element is influenced by decentration.

In the arrangement in which the positive second lens group 20 and the positive fourth lens group 40 are arranged to move integrally, if an attempt is made to provide an aspherical surface in the vicinity of the center portion of these integrally movable lens groups, the adverse effect due to decentration can be made smaller. In other words, it is preferable that an aspherical surface be provided on the most object-side surface of the positive fourth lens group 40.

In the case of an arrangement in which a negative lens element, a positive lens element, a negative lens element, and a positive lens element are provided, in this order from the object, it is common to provide a diaphragm between the positive second lens group 20 and the negative third lens group 30. On the other hand, if an attempt is made to provide the diaphragm S on the object side of the positive second lens group 20, and to move together with the positive second lens group 20 upon zooming, the distance from the image plane to the exit pupil can be made longer. Consequently, telecentricity can advantageously be enhanced. Moreover, the diaphragm S is arranged to approach the negative first lens group 10, so that an increase in lens diameter of the negative first lens group 10 due to an increase in the angle-of-view can be prevented.

Furthermore, if an attempt is made to provide a positive lens element having a convex surface facing toward the image as the most image-side lens element of the positive fourth lens group 40, telecentricity can advantageously be enhanced.

Specific numerical data of the embodiments will be described hereinafter.

In the diagrams showing spherical aberration and the sine condition, SA designates spherical aberration, and SC designates the sine condition.

In the diagrams of chromatic aberration (on-axis chromatic aberration) represented by spherical aberration, the solid line and the two types of dotted lines respectively indicate spherical aberrations with respect to the d, g and C lines.

In the diagrams of lateral chromatic aberration, the two types of dotted lines respectively indicate magnification with respect to the g and C lines; however, the d line as the base line coincides with the ordinate.

In the diagrams of astigmatism, S designates the sagittal image, and M designates the meridional image.

In the tables, FNO designates the f-number, f designates the focal length of the entire wide-angle zoom lens system, fB designates the back focal distance (the equivalent air thickness along the optical axis from the most image-side surface of the positive fourth lens group 40 to the image plane), W designates the half angle-of-view (°), r designates the radius of curvature, d designates the lens-element thickness or distance between lens elements, $N_d$ designates the refractive index of the d-line, and ν designates the Abbe number.

In addition to the above, an aspherical surface which is symmetrical with respect to the optical axis is defined as follows:

$$x = cy^2/(1 + [1 - \{1+K\}c^2y^2]^{1/2}) + A4y^4 + A6y^6 + A8y^8 + A10y^{10}$$

wherein:

c designates a curvature of the aspherical vertex (1/r);

y designates a distance from the optical axis;

K designates the conic coefficient;

A4 designates a fourth-order aspherical coefficient;

A6 designates a sixth-order aspherical coefficient;

A8 designates a eighth-order aspherical coefficient; and

A10 designates a tenth-order aspherical coefficient.

[Embodiment 1]

FIG. 1 is the lens arrangement of the wide-angle zoom lens system at the short focal length extremity, according to the first embodiment of the present invention. FIGS. 2A through 2E show aberrations occurred in the lens arrangement shown in FIG. 1. FIG. 3 is the lens arrangement of the wide-angle zoom lens system, shown in FIG. 1, at the long focal length extremity. FIGS. 4A through 4E show aberrations occurred in the lens arrangement shown in FIG. 3. Table 1 shows the numerical data of the first embodiment.

The negative first lens group 10 includes a negative meniscus lens element 11 having the convex surface facing toward the object, a negative meniscus lens element 12 having the convex surface facing toward the object, a negative meniscus lens element 13, with a weak refractive power, having the convex surface facing toward the object, and a biconvex positive lens element 14, in this order from the object.

The positive second lens group 20 includes a biconvex positive lens element 21, and cemented lens elements constituted by a biconvex positive lens element 22 and a negative lens element 23, in this order from the object.

The negative third lens group 30 includes cemented lens elements constituted by a positive lens element 31 and a negative lens element 32, in this order from the object.

The positive fourth lens group 40 includes a biconvex positive lens element 41, and cemented lens elements constituted by a negative lens element 42 and a positive lens element 43, in this order from the object. The positive lens element 41 which is the most object-side lens element in the positive fourth lens group 40 is an aspherical lens element in which a thin resin aspherical layer is provided on the object-side convex surface thereof.

The diaphragm S is provided 1.50 on the object side (in front of surface No. 9) of the positive second lens group 20.

TABLE 1

FNo. = 1:4.0–4.3–4.9–5.8
f = 16.40–22.60–32.00–43.70
W = 42.1–32.5–23.9–17.9
fB = 37.34–42.79–50.61–60.76
$TL_w$ = 150.96
$TL_t$ = 135.03

| Surf. No. | r | d | Nd | ν |
|---|---|---|---|---|
| 1 | 35.000 | 1.62 | 1.77250 | 49.6 |
| 2 | 16.000 | 9.96 | | |
| 3 | 430.160 | 1.50 | 1.71300 | 53.9 |
| 4 | 24.750 | 2.02 | | |
| 5 | 32.579 | 2.20 | 1.52538 | 56.3 |
| 6* | 29.990 | 4.86 | | |
| 7 | 90.458 | 3.00 | 1.80518 | 25.4 |
| 8 | −198.474 | 44.25–26.33–12.94–4.90 | | |
| 9 | 50.501 | 2.72 | 1.48749 | 70.2 |
| 10 | −50.501 | 1.78 | | |
| 11 | 39.866 | 4.43 | 1.48749 | 70.2 |
| 12 | −21.700 | 1.30 | 1.64769 | 33.8 |
| 13 | −70.280 | 3.20–6.43–11.29–16.19 | | |
| 14 | −54.610 | 2.35 | 1.80518 | 25.4 |
| 15 | −17.593 | 1.40 | 1.76200 | 40.1 |
| 16 | 110.000 | 15.40–12.16–7.30–2.40 | | |
| 17* | 122.122 | 0.24 | 1.52972 | 42.7 |
| 18 | 133.300 | 4.56 | 1.61272 | 58.7 |
| 19 | −29.610 | 0.20 | | |
| 20 | −552.040 | 1.30 | 1.80610 | 33.3 |
| 21 | 21.243 | 5.34 | 1.48749 | 70.2 |
| 22 | −70.280 | — | | |

*designates the aspherical surface which is rotationally symmetrical with respect to the optical axis.
Aspherical surface data (the aspherical surface coefficients not indicated are zero (0.00)):

| Surf. No. | K | A4 | A6 | A8 |
|---|---|---|---|---|
| 6 | −0.10000 × 10 | 0.25000 × 10⁻⁴ | −0.13100 × 10⁻⁷ | −0.11300 × 10⁻⁹ |
| 17 | −0.10000 × 10 | −0.16200 × 10⁻⁴ | | |

[Embodiment 2]

Figure 7:
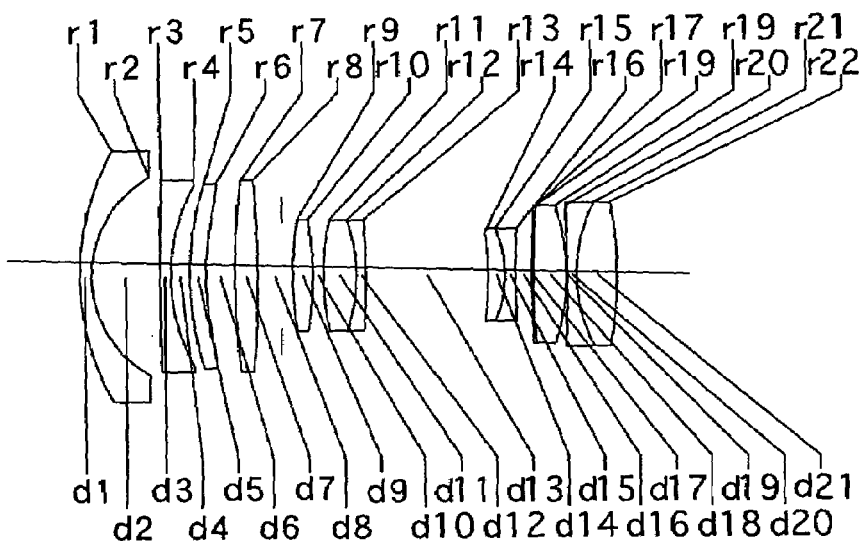
FIG. 7 is a lens arrangement of the wide-angle zoom lens system, shown in FIG. 5, at the long focal length extremity.
Figures 8A, 8B, 8C, 8D, 8E:
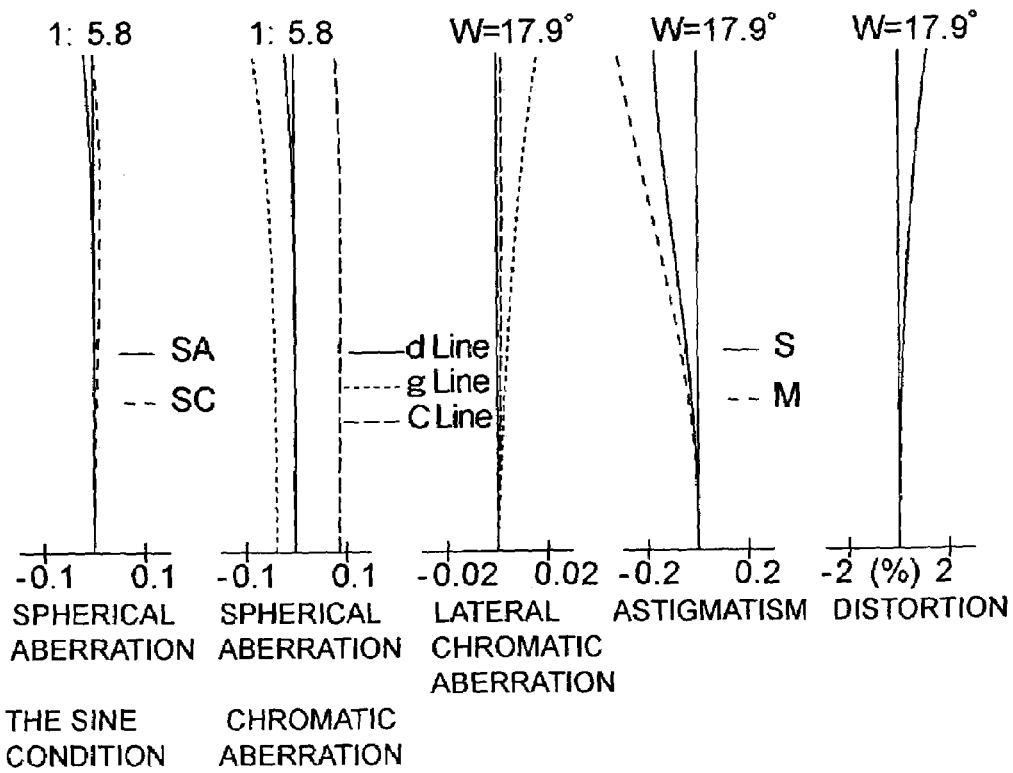
FIGS. 8A, 8B, 8C, 8D and 8E show aberrations occurred in the lens arrangement shown in FIG. 7.

FIG. 5 is the lens arrangement of the wide-angle zoom lens system at the short focal length extremity, according to the second embodiment of the present invention. FIGS. 6A through 6E show aberrations occurred in the lens arrangement shown in FIG. 5. FIG. 7 is the lens arrangement of the wide-angle zoom lens system, shown in FIG. 5, at the long focal length extremity. FIGS. 8A through 8E show aberrations occurred in the lens arrangement shown in FIG. 7. Table 2 shows the numerical data of the second embodiment. The basic lens arrangement of the second embodiment is the same as that of the first embodiment.

The diaphragm S is provided 1.50 on the object side (in front of surface No. 9) of the positive second lens group 20.

TABLE 2

FNo. = 1:4.0–4.3–4.9–5.8
f = 16.40–22.61–32.00–43.70
W = 42.1–32.4–23.8–17.9
fB = 37.00–42.36–50.01–60.07
$TL_w$ = 150.60
$TL_t$ = 134.80

| Surf. No. | r | d | Nd | ν |
|---|---|---|---|---|
| 1 | 36.318 | 1.60 | 1.77250 | 49.6 |
| 2 | 16.009 | 9.49 | | |
| 3 | 385.443 | 1.50 | 1.71300 | 53.9 |
| 4 | 26.268 | 2.66 | | |
| 5 | 42.801 | 2.20 | 1.52538 | 56.3 |
| 6* | 35.253 | 4.06 | | |
| 7 | 99.923 | 3.22 | 1.80518 | 25.4 |

TABLE 2-continued

| | | | | |
|---|---|---|---|---|
| 8 | −163.364 | 43.78−25.96−12.76−4.90 | | |
| 9 | 51.556 | 2.82 | 1.48749 | 70.2 |
| 10 | −43.211 | 1.44 | | |
| 11 | 36.582 | 4.61 | 1.48749 | 70.2 |
| 12 | 23.153 | 1.30 | 1.64769 | 33.8 |
| 13 | −106.046 | 3.82−7.10−12.04−16.92 | | |
| 14 | −51.251 | 2.37 | 1.80518 | 25.4 |
| 15 | −16.159 | 1.40 | 1.76200 | 40.1 |
| 16 | 98.084 | 15.40−12.11−7.18−2.30 | | |
| 17* | 116.716 | 0.24 | 1.52972 | 42.7 |
| 18 | 116.716 | 4.16 | 1.62041 | 60.3 |
| 19 | −30.880 | 0.10 | | |
| 20 | −302.393 | 1.30 | 1.80610 | 33.3 |
| 21 | 22.199 | 5.69 | 1.48749 | 70.2 |
| 22 | −51.460 | — | | |

*designates the aspherical surface which is rotationally symmetrical with respect to the optical axis.
Aspherical surface data (the aspherical surface coefficients not indicated are zero (0.00)):

| Surf. No. | K | A4 | A6 | A8 |
|---|---|---|---|---|
| 6 | −0.10000 × 10 | −0.24974 × $10^{-4}$ | −0.21336 × $10^{-8}$ | −0.14338 × $10^{-9}$ |
| 17 | −0.10000 × 10 | −0.15242 × $10^{-4}$ | | |

[Embodiment 3]

Figure 9:
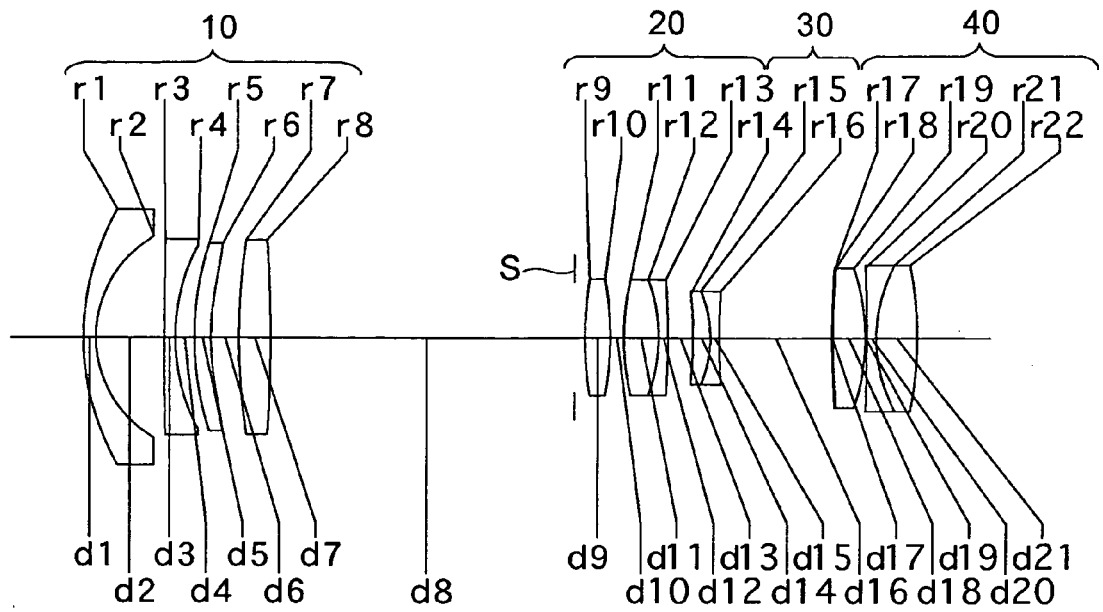
FIG. 9 is a lens arrangement of the wide-angle zoom lens system at the short focal length extremity, according to a third embodiment of the present invention.
Figures 10A, 10B, 10C, 10D, 10E:
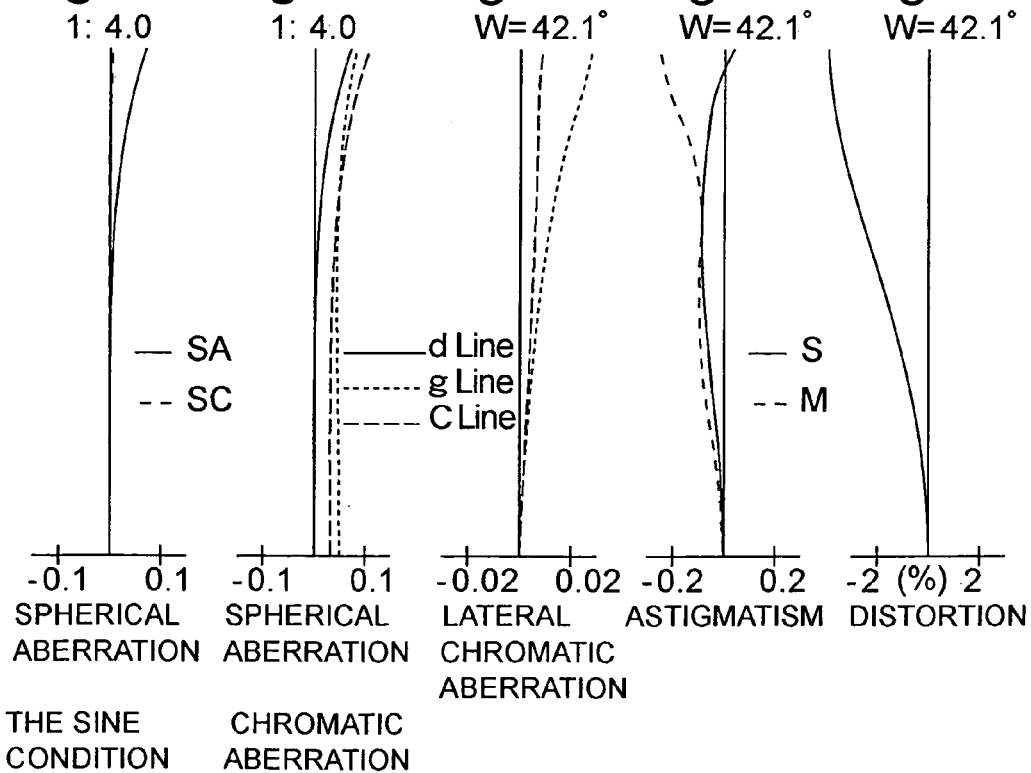
FIGS. 10A, 10B, 10C, 10D and 10E show aberrations occurred in the lens arrangement shown in FIG. 9.

FIG. 9 is the lens arrangement of the wide-angle zoom lens system at the short focal length extremity, according to the third embodiment of the present invention. FIGS. 10A through 10E show aberrations occurred in the lens arrangement shown in FIG. 9. FIG. 11 is the lens arrangement of the wide-angle zoom lens system, shown in FIG. 9, at the long focal length extremity. FIGS. 12A through 12E show aberrations occurred in the lens arrangement shown in FIG. 11. Table 3 shows the numerical data of the third embodiment. The basic lens arrangement of the third embodiment is the same as that of the first embodiment.

The diaphragm S is provided 1.40 on the object side (in front of surface No. 9) of the positive second lens group 20.

TABLE 3

FNo. = 1:4.0−4.2−4.9−5.6
f = 16.40−22.60−32.00−43.70
W = 42.1−32.5−23.8−17.9
fB = 37.02−42.20−49.59−59.67
$TL_w$ = 151.05
$TL_t$ = 135.29

| Surf. No. | r | d | Nd | ν |
|---|---|---|---|---|
| 1 | 35.799 | 1.66 | 1.77250 | 49.6 |
| 2 | 16.076 | 9.38 | | |
| 3 | 607.468 | 1.50 | 1.72916 | 54.7 |
| 4 | 26.970 | 2.64 | | |
| 5 | 42.654 | 2.22 | 1.52538 | 56.3 |
| 6* | 34.745 | 3.84 | | |
| 7 | 90.420 | 4.35 | 1.80518 | 25.4 |
| 8 | −192.864 | 42.81−25.20−12.15−4.40 | | |
| 9 | 51.831 | 3.50 | 1.48749 | 70.2 |
| 10 | −43.865 | 1.86 | | |
| 11 | 35.592 | 4.80 | 1.48749 | 70.2 |
| 12 | −23.007 | 1.30 | 1.65199 | 33.6 |
| 13 | −102.151 | 3.46−6.88−12.01−16.86 | | |
| 14 | −51.739 | 2.35 | 1.80518 | 25.4 |
| 15 | −16.710 | 1.20 | 1.76200 | 40.4 |
| 16 | 94.531 | 15.40−11.98−6.85−2.00 | | |
| 17* | 108.561 | 0.10 | 1.52972 | 42.7 |
| 18 | 108.561 | 4.49 | 1.61800 | 63.4 |
| 19 | −30.142 | 0.23 | | |
| 20 | −256.211 | 1.30 | 1.80100 | 35.0 |

TABLE 3-continued

| | | | | |
|---|---|---|---|---|
| 21 | 21.927 | 5.62 | 1.48749 | 70.2 |
| 22 | −52.380 | — | | |

*designates the aspherical surface which is rotationally symmetrical with respect to the optical axis.
Aspherical surface data (the aspherical surface coefficients not indicated are zero (0.00)):

| Surf. No | K | A4 | A6 | A8 |
|---|---|---|---|---|
| 6 | −0.10000 × 10 | −0.23784 × $10^{-4}$ | −0.31853 × $10^{-8}$ | −0.12123 × $10^{-9}$ |
| 17 | −0.10000 × 10 | −0.15466 × $10^{-4}$ | 0.68345 × $10^{-11}$ | |

[Embodiment 4]

Figure 13:
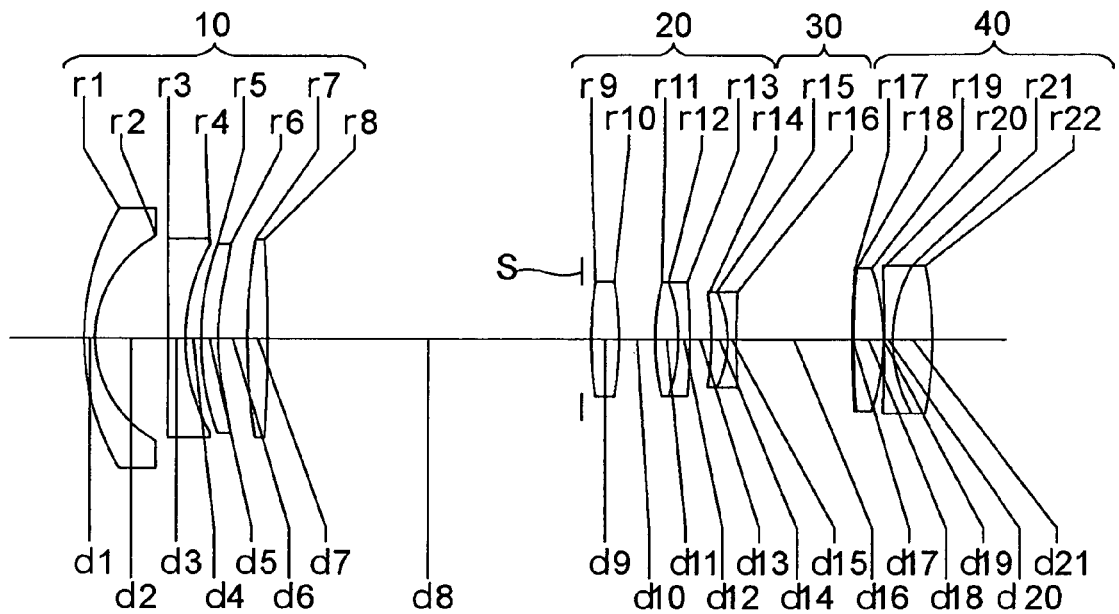
FIG. 13 is a lens arrangement of the wide-angle zoom lens system at the short focal length extremity, according to a fourth embodiment of the present invention.
Figures 14A, 14B, 14C, 14D, 14E:
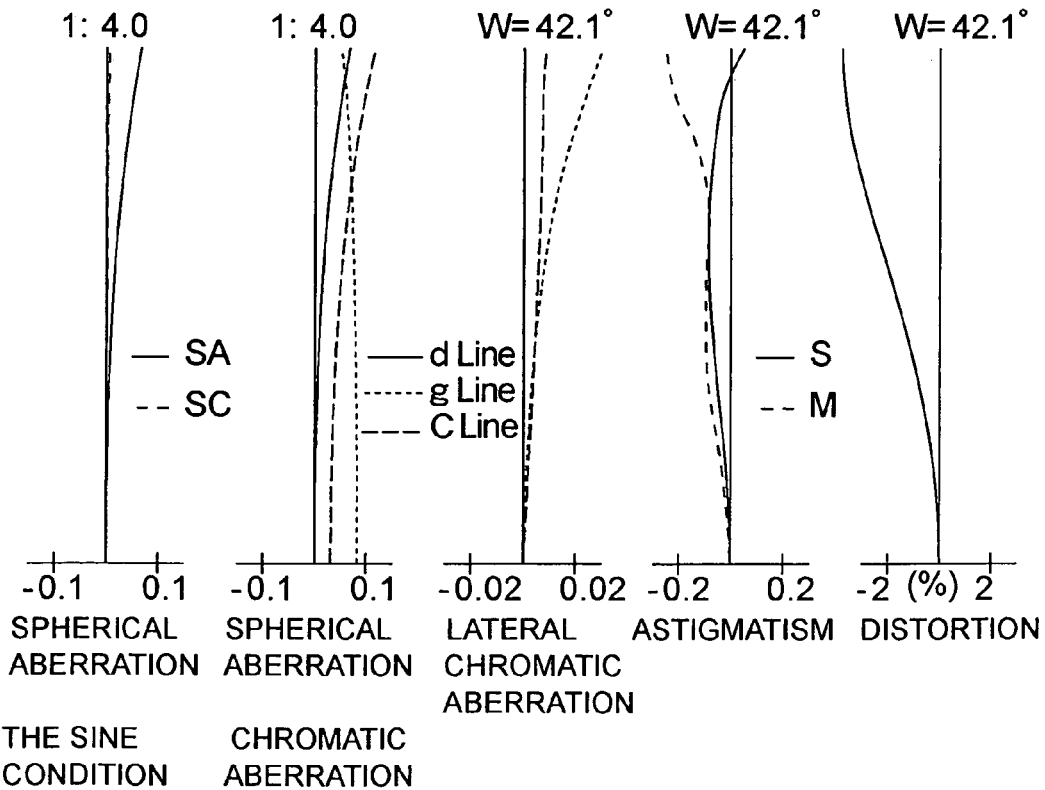
FIGS. 14A, 14B, 14C, 14D and 14E show aberrations occurred in the lens arrangement shown in FIG. 13.

FIG. 13 is the lens arrangement of the wide-angle zoom lens system at the short focal length extremity, according to the fourth embodiment of the present invention. FIGS. 14A through 14E show aberrations occurred in the lens arrangement shown in FIG. 13. FIG. 15 is the lens arrangement of the wide-angle zoom lens system, shown in FIG. 13, at the long focal length extremity. FIGS. 16A through 16E show aberrations occurred in the lens arrangement shown in FIG. 15. Table 4 shows the numerical data of the fourth embodiment. The basic lens arrangement of the fourth embodiment is the same as that of the first embodiment.

The diaphragm S is provided 1.18 on the object side (in front of surface No. 9) of the positive second lens group 20.

TABLE 4

FNo. = 1:4.0−4.3−4.9−5.7
f = 16.40−22.59−32.00−43.70
W = 42.1−32.4−23.8−17.8
fB = 37.04−42.09−49.50−59.63
$TL_w$ = 151.00
$TL_t$ = 134.77

| Surf. No. | r | d | Nd | ν |
|---|---|---|---|---|
| 1 | 35.101 | 1.50 | 1.76358 | 50.3 |
| 2 | 15.950 | 9.81 | | |
| 3 | −1344.617 | 2.31 | 1.68759 | 56.0 |
| 4 | 26.465 | 2.08 | | |
| 5 | 38.777 | 2.25 | 1.52538 | 56.3 |
| 6* | 33.469 | 3.90 | | |
| 7 | 90.020 | 2.73 | 1.80518 | 25.4 |
| 8 | −196.521 | 43.42−25.68−12.45−4.59 | | |
| 9 | 53.811 | 3.73 | 1.51455 | 74.2 |
| 10 | −47.369 | 4.94 | | |
| 11 | 33.381 | 3.18 | 1.48749 | 70.2 |
| 12 | −23.149 | 1.54 | 1.65824 | 33.8 |
| 13 | −90.200 | 2.91−6.39−11.50−16.31 | | |
| 14 | −46.795 | 2.25 | 1.80518 | 25.5 |
| 15 | −15.008 | 1.20 | 1.75235 | 38.1 |
| 16 | 103.858 | 15.40−11.92−6.81−2.00 | | |
| 17* | 111.698 | 0.20 | 1.52972 | 42.7 |
| 18 | 111.698 | 3.98 | 1.60618 | 61.6 |
| 19 | −30.179 | 0.10 | | |
| 20 | −259.734 | 1.20 | 1.79791 | 36.3 |
| 21 | 21.132 | 5.35 | 1.48749 | 70.2 |
| 22 | −52.280 | — | | |

*designates the aspherical surface which is rotationally symmetrical with respect to the optical axis.
Aspherical surface data (the aspherical surface coefficients not indicated are zero (0.00)):

| Surf. No. | K | A4 | A6 | A8 |
|---|---|---|---|---|
| 6 | −0.10000 × 10 | −0.24900 × $10^{-4}$ | −0.19100 × $10^{-8}$ | −0.13900 × $10^{-9}$ |
| 17 | −0.10000 × 10 | −0.15550 × $10^{-4}$ | | |

[Embodiment 5]

FIG. 17 is the lens arrangement of the wide-angle zoom lens system at the short focal length extremity, according to the fifth embodiment of the present invention. FIGS. 18A through 18E show aberrations occurred in the lens arrangement shown in FIG. 17. FIG. 19 is the lens arrangement of the wide-angle zoom lens system, shown in FIG. 17, at the long focal length extremity. FIGS. 20A through 20E show aberrations occurred in the lens arrangement shown in FIG. 19. Table 5 shows the numerical data of the fifth embodiment. The basic lens arrangement of the fifth embodiment is the same as that of the first embodiment. The positive lens element 41 which is the most object-side lens element in the positive fourth lens group 40 is a glass-molded aspherical lens element.

The diaphragm S is provided 1.27 on the object side (in front of surface No. 9) of the positive second lens group 20.

TABLE 5

FNo. = 1:4.1–4.3–4.9–5.8
f = 16.40–22.60–32.00–43.70
W = 42.1–32.4–23.8–17.9
fB = 37.00–42.16–49.68–59.77
$TL_w$ = 151.94
$TL_t$ = 134.56

| Surf. No. | r | d | Nd | ν |
|---|---|---|---|---|
| 1 | 35.401 | 1.65 | 1.77149 | 49.8 |
| 2 | 16.024 | 9.67 | | |
| 3 | −758.886 | 2.20 | 1.69724 | 55.5 |
| 4 | 26.392 | 2.13 | | |
| 5 | 39.256 | 2.25 | 1.52538 | 56.3 |
| 6* | 33.421 | 3.52 | | |
| 7 | 85.863 | 2.84 | 1.80518 | 25.4 |
| 8 | −174.429 | 43.83–25.95–12.61–4.67 | | |
| 9 | 53.874 | 3.37 | 1.50486 | 80.0 |
| 10 | −48.009 | 5.85 | | |
| 11 | 32.799 | 3.42 | 1.48749 | 70.2 |
| 12 | −22.375 | 1.30 | 1.64498 | 34.0 |
| 13 | −87.145 | 2.53–5.98–11.04–15.93 | | |
| 14 | −47.119 | 2.19 | 1.80500 | 34.0 |
| 15 | −15.637 | 1.20 | 1.75001 | 39.2 |
| 16 | 106.761 | 15.40–11.96–6.89–2.00 | | |
| 17* | 113.933 | 3.94 | 1.59759 | 62.4 |
| 18 | −28.720 | 0.10 | | |
| 19 | −158.559 | 1.20 | 1.78817 | 37.1 |
| 20 | 21.445 | 5.35 | 1.48749 | 70.2 |
| 21 | −50.586 | — | | |

*designates the aspherical surface which is rotationally symmetrical with respect to the optical axis.
Aspherical surface data (the aspherical surface coefficients not indicated are zero (0.00)):

| Surf. No. | K | A4 | A6 | A8 |
|---|---|---|---|---|
| 6 | −0.10000 × 10 | −0.24821 × $10^{-4}$ | −0.84918 × $10^{-9}$ | −0.13260 × $10^{-9}$ |
| 17 | −0.10000 × 10 | −0.15085 × $10^{-4}$ | −0.19983 × $10^{-9}$ | |

[Embodiment 6]

FIG. 21 is the lens arrangement of the wide-angle zoom lens system at the short focal length extremity, according to the sixth embodiment of the present invention. FIGS. 22A through 22E show aberrations occurred in the lens arrangement shown in FIG. 21. FIG. 23 is the lens arrangement of the wide-angle zoom lens system, shown in FIG. 21, at the long focal length extremity. FIGS. 24A through 24E show aberrations occurred in the lens arrangement shown in FIG. 23. Table 6 shows the numerical data of the sixth embodiment. The basic lens arrangement of the sixth embodiment is the same as that of the fifth embodiment.

The diaphragm S is provided 1.53 on the object side (in front of surface No. 9) of the positive second lens group 20.

TABLE 6

FNo. = 1:4.0–4.3–4.9–5.7
f = 16.40–22.60–32.00–43.70
W = 42.1–32.4–23.8–17.8
fB = 37.00–41.90–49.15–58.95
$TL_w$ = 147.63
$TL_t$ = 131.39

| Surf. No. | r | d | Nd | ν |
|---|---|---|---|---|
| 1 | 36.221 | 1.65 | 1.77000 | 50.7 |
| 2 | 15.957 | 9.57 | | |
| 3 | −1895.923 | 2.20 | 1.65000 | 58.6 |
| 4 | 26.869 | 2.15 | | |
| 5 | 41.167 | 2.13 | 1.52538 | 56.3 |
| 6* | 33.886 | 3.47 | | |
| 7 | 80.110 | 2.72 | 1.80518 | 25.4 |
| 8 | −270.100 | 42.71–25.26–12.27–4.53 | | |
| 9 | 54.935 | 2.66 | 1.51244 | 74.1 |
| 10 | −47.097 | 5.04 | | |
| 11 | 32.917 | 3.39 | 1.48749 | 70.2 |
| 12 | −22.029 | 1.30 | 1.64529 | 34.0 |
| 13 | −86.817 | 2.47–5.94–11.00–15.87 | | |
| 14 | −46.169 | 2.19 | 1.80500 | 25.7 |
| 15 | −15.282 | 1.20 | 1.74779 | 38.7 |
| 16 | 103.319 | 15.40–11.93–6.87–2.00 | | |
| 17* | 113.762 | 3.78 | 1.60170 | 62.2 |
| 18 | −28.977 | 0.10 | | |
| 19 | −156.840 | 1.20 | 1.77924 | 37.1 |
| 20 | 21.194 | 5.30 | 1.48749 | 70.2 |
| 21 | −47.996 | — | | |

*designates the aspherical surface which is rotationally symmetrical with respect to the optical axis.
Aspherical surface data (the aspherical surface coefficients not indicated are zero (0.00)):

| Surf. No. | K | A4 | A6 | A8 |
|---|---|---|---|---|
| 6 | −0.10000 × 10 | −0.24170 × $10^{-4}$ | −0.39618 × $10^{-8}$ | −0.13876 × $10^{-9}$ |
| 17 | −0.10000 × 10 | −0.14656 × $10^{-4}$ | 0.10445 × $10^{-8}$ | |

[Embodiment 7]

FIG. 25 is the lens arrangement of the wide-angle zoom lens system at the short focal length extremity, according to the seventh embodiment of the present invention. FIGS. 26A through 26E show aberrations occurred in the lens arrangement shown in FIG. 25. FIG. 27 is the lens arrangement of the wide-angle zoom lens system, shown in FIG. 25, at the long focal length extremity. FIGS. 28A through 28E show aberrations occurred in the lens arrangement shown in FIG. 27. Table 7 shows the numerical data of the seventh embodiment. The basic lens arrangement of the seventh embodiment is the same as that of the first embodiment except that the positive second lens group 20 includes a biconvex positive lens element 21, a biconvex positive lens element 22, and cemented lens elements constituted by a biconvex positive lens element 23 and a negative lens element 24, in this order from the object.

The diaphragm S is provided 1.60 on the object side (in front of surface No. 9) of the positive second lens group 20.

TABLE 7

FNo. = 1:4.1–4.1–4.1–4.1
f = 16.30–22.60–31.90–43.70
W = 42.2–32.4–23.8–17.8
fB = 37.20–41.84–47.79–55.44
TL$_w$ = 147.63
TL$_t$ = 131.39

| Surf. No. | r | d | Nd | ν |
|---|---|---|---|---|
| 1 | 61.603 | 1.60 | 1.69680 | 55.5 |
| 2 | 18.301 | 9.20 | | |
| 3 | 115.695 | 1.50 | 1.71300 | 53.9 |
| 4 | 31.880 | 3.86 | | |
| 5 | 55.465 | 2.20 | 1.52538 | 56.3 |
| 6* | 43.390 | 5.56 | | |
| 7 | 561.840 | 2.65 | 1.84666 | 23.8 |
| 8 | −118.851 | 55.54–32.60–15.60–5.00 | | |
| 9 | 125.769 | 2.07 | 1.48749 | 70.2 |
| 10 | −335.866 | 0.20 | | |
| 11 | 60.094 | 3.65 | 1.49700 | 81.6 |
| 12 | −60.094 | 0.40 | | |
| 13 | 38.011 | 5.93 | 1.48749 | 70.2 |
| 14 | −29.480 | 1.30 | 1.67270 | 32.1 |
| 15 | −144.045 | 2.35–5.33–10.05–15.45 | | |
| 16 | −60.055 | 3.05 | 1.80518 | 25.4 |
| 17 | −16.694 | 1.20 | 1.76200 | 40.1 |
| 18 | 74.773 | 15.40–12.42–7.69–2.30 | | |
| 19* | −1915.812 | 0.10 | 1.52972 | 42.7 |
| 20 | −1915.812 | 4.76 | 1.58913 | 61.2 |
| 21 | −31.027 | 0.10 | | |
| 22 | 236.582 | 1.30 | 1.80610 | 33.3 |
| 23 | 19.571 | 5.88 | 1.48749 | 70.2 |
| 24 | −56.464 | — | | |

*designates the aspherical surface which is rotationally symmetrical with respect to the optical axis.
Aspherical surface data (the aspherical surface coefficients not indicated are zero (0.00)):

| Surf. No. | K | A4 | A6 | A8 |
|---|---|---|---|---|
| 6 | −0.10000 × 10 | −0.17340 × 10$^{-4}$ | −0.27573 × 10$^{-8}$ | −0.56998 × 10$^{-10}$ |
| 19 | −0.10000 × 10 | −0.10443 × 10$^{-4}$ | 0.16453 × 10$^{-8}$ | |

[Embodiment 8]

Figure 31:
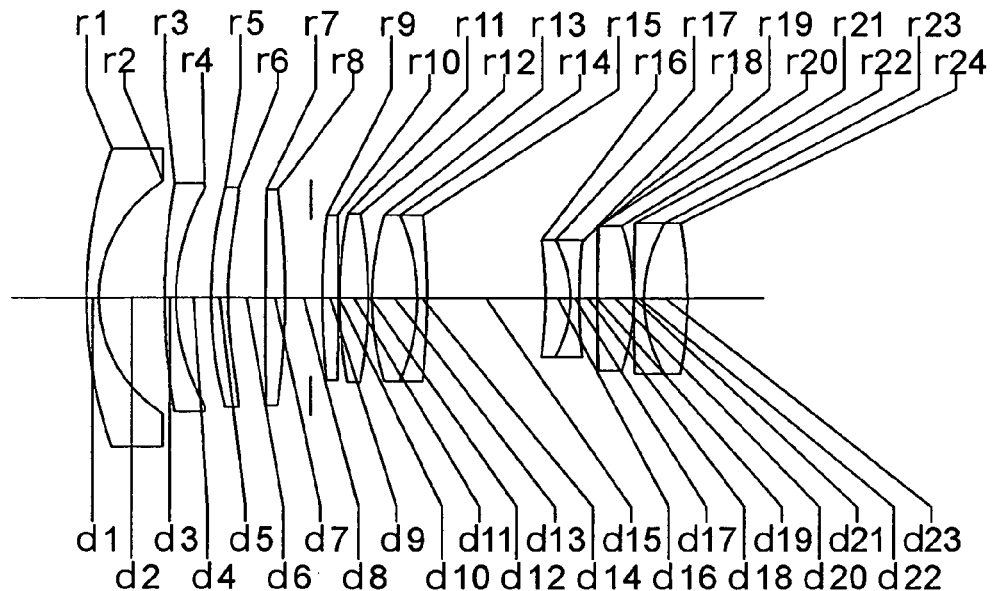
FIG. 31 is a lens arrangement of the wide-angle zoom lens system, shown in FIG. 29, at the long focal length extremity.
Figures 32A, 32B, 32C, 32D, 32E:
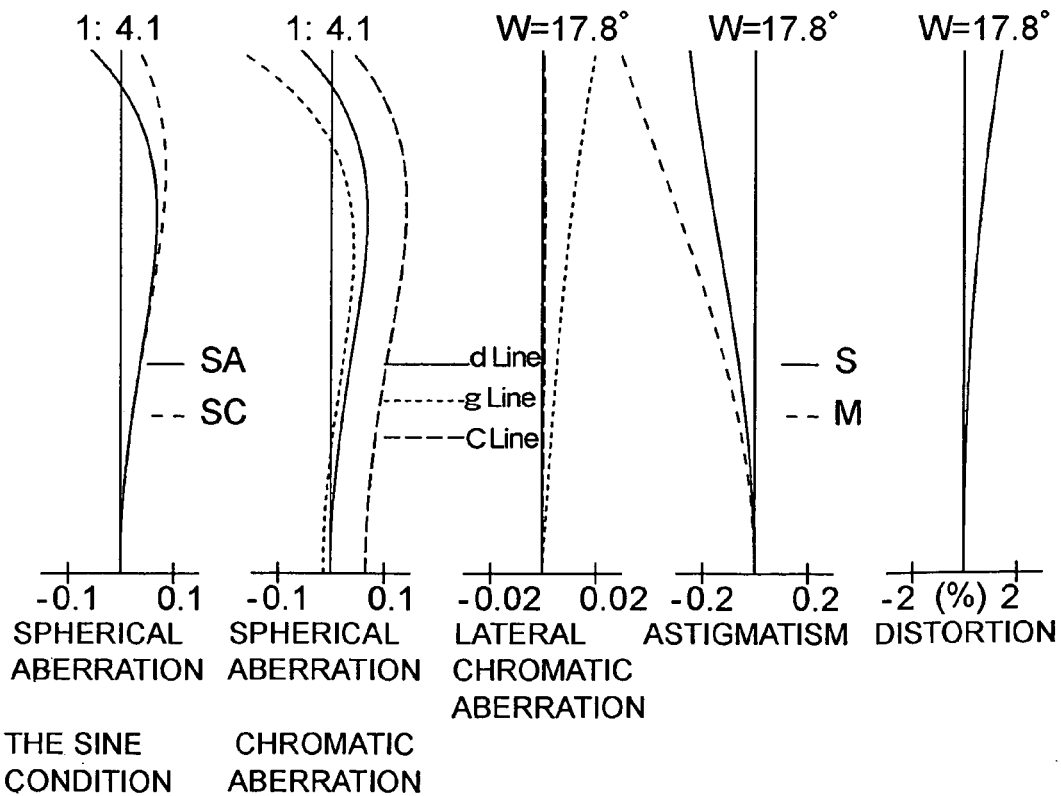
FIGS. 32A, 32B, 32C, 32D and 32E show aberrations occurred in the lens arrangement shown in FIG. 31.

FIG. 29 is the lens arrangement of the wide-angle zoom lens system at the short focal length extremity, according to the eighth embodiment of the present invention. FIGS. 30A through 30E show aberrations occurred in the lens arrangement shown in FIG. 29. FIG. 31 is the lens arrangement of the wide-angle zoom lens system, shown in FIG. 29, at the long focal length extremity. FIGS. 32A through 32E show aberrations occurred in the lens arrangement shown in FIG. 31. Table 8 shows the numerical data of the eighth embodiment. The basic lens arrangement of the eighth embodiment is the same as that of the seventh embodiment.

The diaphragm S is provided 1.60 on the object side (in front of surface No. 9) of the positive second lens group 20.

TABLE 8

FNo. = 1:4.1–4.1–4.1–4.1
f = 16.30–22.59–31.90–43.70
W = 42.2–32.5–23.8–17.8
fB = 37.22–41.85–47.89–55.90
TL$_w$ = 147.63
TL$_t$ = 131.39

| Surf. No. | r | d | Nd | ν |
|---|---|---|---|---|
| 1 | 61.500 | 1.60 | 1.69680 | 55.5 |
| 2 | 18.346 | 8.79 | | |

TABLE 8-continued

| Surf. No. | r | d | Nd | ν |
|---|---|---|---|---|
| 3 | 89.373 | 1.50 | 1.71300 | 53.9 |
| 4 | 29.259 | 4.67 | | |
| 5 | 58.477 | 2.20 | 1.52538 | 56.3 |
| 6* | 44.918 | 4.98 | | |
| 7 | 1012.500 | 2.60 | 1.84666 | 23.8 |
| 8 | −108.664 | 54.81–32.14–15.38–5.01 | | |
| 9 | 104.800 | 2.10 | 1.48749 | 70.2 |
| 10 | −508.340 | 0.20 | | |
| 11 | 63.950 | 3.70 | 1.49700 | 81.6 |
| 12 | −63.950 | 0.52 | | |
| 13 | 40.113 | 5.94 | 1.48749 | 70.2 |
| 14 | −28.179 | 1.30 | 1.67270 | 32.1 |
| 15 | −108.316 | 2.66–5.71–10.50–15.76 | | |
| 16 | −58.917 | 3.23 | 1.80518 | 25.4 |
| 17 | −16.614 | 1.20 | 1.76200 | 40.1 |
| 18 | 75.438 | 15.40–12.34–7.55–2.30 | | |
| 19* | 278.456 | 0.10 | 1.52972 | 42.7 |
| 20 | 280.000 | 4.76 | 1.58913 | 61.2 |
| 21 | −30.938 | 0.10 | | |
| 22 | 575.504 | 1.30 | 1.80610 | 33.3 |
| 23 | 20.240 | 5.71 | 1.48749 | 70.2 |
| 24 | −58.125 | — | | |

*designates the aspherical surface which is rotationally symmetrical with respect to the optical axis.
Aspherical surface data (the aspherical surface coefficients not indicated are zero (0.00)):

| Surf. No. | K | A4 | A6 | A8 |
|---|---|---|---|---|
| 6 | −0.10000 × 10 | −0.17710 × 10$^{-4}$ | −0.45910 × 10$^{-8}$ | −0.56900 × 10$^{-10}$ |
| 19 | −0.10000 × 10 | −0.11930 × 10$^{-4}$ | 0.29100 × 10$^{-8}$ | |

[Embodiment 9]

FIG. 33 is the lens arrangement of the wide-angle zoom lens system at the short focal length extremity, according to the ninth embodiment of the present invention. FIGS. 34A through 34E show aberrations occurred in the lens arrangement shown in FIG. 33. FIG. 35 is the lens arrangement of the wide-angle zoom lens system, shown in FIG. 33, at the long focal length extremity. FIGS. 36A through 36E show aberrations occurred in the lens arrangement shown in FIG. 35. Table 9 shows the numerical data of the ninth embodiment. The basic lens arrangement of the ninth embodiment is the same as that of the seventh embodiment.

The diaphragm S is provided 1.50 on the object side (in front of surface No. 9) of the positive second lens group 20.

TABLE 9

FNo. = 1:3.2–3.5–4.0–4.6
f = 16.30–22.60–31.89–43.70
W = 42.2–32.6–24.0–17.9
fB = 38.14–43.21–50.06–59.33
TL$_w$ = 147.63
TL$_t$ = 131.39

| Surf. No. | r | d | Nd | ν |
|---|---|---|---|---|
| 1 | 35.000 | 1.60 | 1.77250 | 49.6 |
| 2 | 18.043 | 11.17 | | |
| 3 | 626.030 | 1.50 | 1.71300 | 53.9 |
| 4 | 27.506 | 3.93 | | |
| 5 | 47.906 | 2.20 | 1.52538 | 56.3 |
| 6* | 37.860 | 5.69 | | |
| 7 | 142.427 | 2.99 | 1.80518 | 25.4 |
| 8 | −164.920 | 52.33–30.74–14.81–4.90 | | |
| 9 | 388.486 | 1.48 | 1.58913 | 61.2 |
| 10 | −328.902 | 0.20 | | |
| 11 | 83.050 | 2.97 | 1.48749 | 70.2 |
| 12 | −57.083 | 0.50 | | |
| 13 | 34.155 | 5.29 | 1.48749 | 70.2 |

TABLE 9-continued

| | | | | |
|---|---|---|---|---|
| 14 | −28.116 | 1.30 | 1.66680 | 33.0 |
| 15 | −112.249 | 2.14–5.31–10.17–15.24 | | |
| 16 | −77.431 | 2.69 | 1.80518 | 25.4 |
| 17 | −20.892 | 1.20 | 1.76200 | 40.1 |
| 18 | 81.895 | 15.40–12.23–7.37–2.30 | | |
| 19* | 313.107 | 0.10 | 1.52972 | 42.7 |
| 20 | 313.107 | 4.76 | 1.58913 | 61.2 |
| 21 | −31.160 | 0.10 | | |
| 22 | 124.786 | 1.30 | 1.80610 | 33.3 |
| 23 | 18.222 | 5.26 | 1.48749 | 70.2 |
| 24 | −144.055 | — | | |

*designates the aspherical surface which is rotationally symmetrical with respect to the optical axis.
Aspherical surface data (the aspherical surface coefficients not indicated are zero (0.00)):

| Surf. No. | K | A4 | A6 | A8 |
|---|---|---|---|---|
| 6 | $-0.10000 \times 10$ | $-0.18163 \times 10^{-4}$ | $-0.13623 \times 10^{-8}$ | $-0.55096 \times 10^{-10}$ |
| 19 | $-0.10000 \times 10$ | $-0.10883 \times 10^{-4}$ | $0.29355 \times 10^{-8}$ | |

The numerical values of each condition of each embodiment are shown in Table 10.

TABLE 10

| | Embod. 1 | Embod. 2 | Embod. 3 | Embod. 4 | Embod. 5 |
|---|---|---|---|---|---|
| Cond. (1, 1') | 1.55 | 1.54 | 1.53 | 1.51 | 1.52 |
| Cond. (2, 2') | 1.90 | 1.88 | 1.88 | 1.86 | 1.87 |
| Cond. (3, 3') | 3.15 | 2.91 | 2.87 | 2.89 | 2.94 |
| Cond. (4, 4') | 3.83 | 3.50 | 3.45 | 3.64 | 3.72 |
| Cond. (5) | 1.12 | 1.12 | 1.12 | 1.12 | 1.12 |

| | Embod. 6 | Embod. 7 | Embod. 8 | Embod. 9 |
|---|---|---|---|---|
| Cond. (1, 1') | 1.53 | 1.74 | 1.73 | 1.71 |
| Cond. (2, 2') | 1.84 | 1.90 | 1.93 | 1.99 |
| Cond. (3, 3') | 2.89 | 2.89 | 2.86 | 3.45 |
| Cond. (4, 4') | 3.56 | 4.27 | 4.08 | 4.63 |
| Cond. (5) | 1.12 | 1.24 | 1.23 | 1.19 |

As can be understood from Table 10, each embodiment satisfies each of conditions (1) through (5), and aberrations are relatively well corrected. Furthermore, with exception to embodiment 9, conditions (1') through (4') are satisfied.

According to the above description, a wide-angle zoom lens system for a digital single lens reflex (SLR) camera having an image pick-up surface size of 14.24 mm with respect to a diagonal image height can be obtained. More specifically, the wide-angle zoom lens system has an angle-of-view of 80° or more at the short focal length extremity, and has a zoom ratio exceeding 2.5.

What is claimed is:

1. A wide-angle zoom lens system comprising a negative first lens group, a positive second lens group, a negative third lens group, and a positive fourth lens group, in this order from an object;

wherein upon zooming from the short focal length extremity to the long focal length extremity, the distance between said negative first lens group and said positive second lens group decreases, the distance between said positive second lens group and said negative third lens group increases, and the distance between said negative third lens group and said positive fourth lens group decreases;

wherein said positive second lens group, said negative third lens group and said positive fourth lens group are arranged to move toward said object; and wherein said wide-angle zoom lens system satisfies the following conditions:

$$1.2 < |f_{(i=1)}/f_W| < 2.0$$

$$1.5 < |f_{(i=2)}/f_W| < 2.2$$

$$2.5 < |f_{(i=3)}/f_W| < 3.6$$

$$3.2 < |f_{(i=4)}/f_W| < 4.7$$

wherein fi designates the focal length (f1<0, f3<0) of the $i^{th}$ lens group (i=1~4); and $f_W$ designates the focal length of the entire the wide-angle zoom lens system at the short focal length extremity.

2. The wide-angle zoom lens system according to claim 1, further satisfying the following condition:

$$1.05 < TL_w/TL_t < 1.30$$

wherein $TL_w$ designates the distance from the most object-side surface of said negative first lens group to the image plane at the short focal length extremity; and $TL_t$ designates the distance from the most object-side surface of said negative first lens group to the image plane at the long focal length extremity.

3. The wide-angle zoom lens system according to claim 1, wherein said negative first lens group comprises at least one lens element having an aspherical surface thereon.

4. The wide-angle zoom lens system according to claim 1, wherein said positive second lens group and said positive fourth lens group are arranged to integrally move upon zooming.

5. The wide-angle zoom lens system according to claim 1, wherein said positive fourth lens group comprises at least one positive lens element and at least one negative lens element; and wherein the most object-side surface of said positive fourth lens group is made aspherical.

6. The wide-angle zoom lens system according to claim 1, wherein a diaphragm is provided on the object side of said positive second lens group, and is arranged to move together with said positive second lens group upon zooming.

7. The wide-angle zoom lens system according to claim 1, wherein the most image-side lens element of said positive fourth lens group comprises a positive lens element having a convex surface facing toward said image.

8. The wide-angle zoom lens system according to claim 1, wherein upon zooming from the short focal length extremity to the long focal length extremity, said negative first lens group is arranged to initially move toward said image, and thereafter to move toward said object.

* * * * *